US007313144B2

United States Patent
Kobayashi et al.

(10) Patent No.: US 7,313,144 B2
(45) Date of Patent: Dec. 25, 2007

(54) FRAME TRANSMISSION DEVICE

(75) Inventors: Daisuke Kobayashi, Yokohama (JP);
Hirofumi Yagawa, Yokohama (JP);
Toshinobu Tsunematsu, Yokohama (JP); Katsuhiko Hirashima, Yokohama (JP); Yoshinari Sugimoto, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 778 days.

(21) Appl. No.: 10/867,788

(22) Filed: Jun. 15, 2004

(65) Prior Publication Data

US 2005/0141416 A1 Jun. 30, 2005

(30) Foreign Application Priority Data

Dec. 24, 2003 (JP) ............... 2003-426057

(51) Int. Cl.
*H04L 12/28* (2006.01)
*H04L 12/56* (2006.01)
(52) U.S. Cl. .................... 370/395.43; 370/522
(58) Field of Classification Search ........... 370/395.43, 370/522–524, 527, 528, 474, 463, 468, 395.21, 370/395.3, 470, 471, 229, 412, 377, 434
See application file for complete search history.

(56) References Cited

U.S. PATENT DOCUMENTS 6,469,982 B1 * 10/2002 Henrion et al. ............ 370/230

2003/0135823 A1 * 7/2003 Marejka et al. ............ 715/511
2005/0135337 A1 * 6/2005 Nabeta et al. ............ 370/352
2005/0175014 A1 * 8/2005 Patrick .................. 370/395.43

FOREIGN PATENT DOCUMENTS

JP   2003-298540   10/2003

* cited by examiner

*Primary Examiner*—Seema S. Rao
*Assistant Examiner*—Mon Cheri S. Davenport
(74) *Attorney, Agent, or Firm*—Katten Muchin Rosenman LLP

(57) ABSTRACT

A frame transmission device which does not require a separate supervisory line and enables supervisory frames to efficiently enter subscriber traffic for transmission without securing a fixed bandwidth. A supervisory token computing section gives supervisory frames supervisory tokens as permission to transmit within a minimum bandwidth. Subscriber token computing sections give subscriber frames subscriber tokens as permission to transmit within respective set transmission bandwidths. A best-effort token computing section gives the frames best-effort tokens as permission to transmit by using an extra bandwidth. The supervisory or subscriber tokens are given to read frames from a supervisory queue or subscriber queues, and if a frame queue length is smaller than or equal to the best-effort tokens remains in the queue, a queue read control section reads and outputs the remaining frames from the queue by using the extra bandwidth of best-effort tokens.

13 Claims, 16 Drawing Sheets

FRAME TRANSMISSION DEVICE

CROSS-REFERENCE TO RELATED APPLICATIONS

This application is based upon and claims priority of Japanese Patent Application No. 2003-426057, filed on Dec. 24, 2003, the contents being incorporated herein by reference.

BACKGROUND OF THE INVENTION (1) Field of the Invention

The present invention relates to a frame transmission device, and more particularly, to a frame transmission device for causing supervisory frames to enter subscriber traffic to be transmitted along with subscriber frames.

(2) Description of the Related Art

With the recent advance of multimedia, the demand for information communication networks is becoming higher in level and diversifying, and thus the development of network communication technologies is being swiftly forwarded to realize advanced information-oriented society. The mainstream of currently configured networks is IP (Internet Protocol)-based network typified by the Internet, and further improvement in serviceability of IP networks is demanded.

IP network has evolved as a best effort type network (form of communication in which best efforts are exerted to minimize delay, packet loss, etc.), but because of explosive spread of the Internet, what users demand from carriers (telecommunication carriers) is shifting from the conventional "best effort" to "QoS (Quality of Service)".

For example, in the case of VoIP (Voice over IP) service whereby voice is transmitted over an IP network, even a best effort-based IP network is required to provide QoS that can maintain a certain level of speech quality such as ease of hearing and ease of conversation.

To provide such high-quality communication service, it is necessary to monitor the QoS of the network so that when the quality degrades due to network congestion or the occurrence of fault, for example, such degradation can be promptly detected to restore the quality to a normal level. Thus, network supervision such as QoS monitoring is acquiring a greater importance and the development of network supervisory systems with high monitoring functionality is strongly demanded.

FIG. 16 illustrates the configuration of a conventional network supervisory system. An IP network 200 as an upstream-side network and an Ethernet (registered trademark) 230 as a downstream-side network are connected by repeaters 210 and 240. The Ethernet 230 is provided with hubs Ha and Hb.

First, the connection of a transmission line (link) L1 for primary signal (subscriber frames) will be explained. The repeater 210, which is provided at the edge of the IP network 200, connects with the IP network 200 through a LAN port Lp1a. The hub Ha connects with the repeater 210 through a port ha1.

The hubs Ha and Hb are connected to each other through a subscriber traffic line in the Ethernet 230. The hub Hb has a port hb1 connected to a LAN port Lp2a of the repeater 240 which is connected to a subscriber terminal 250. Using the transmission line L1 connected in this manner, the primary signal is exchanged between the subscriber terminal 250 and the IP network 200.

Supervisory lines L2a and L2b for monitoring the repeaters 210 and 240 are connected in the manner described below. When monitoring the repeater 210, an SNMP (Simple Network Management Protocol) manager 220, which is a supervisory terminal, connects with an RS232C port of the repeater 210 to acquire supervisory information in the repeater through the supervisory line L2a.

When monitoring the repeater 240 which is located at a remote subscriber's site, the SNMP manager 220 connects with a port ha2 of the hub Ha. Then, the hubs Ha and Hb connect with each other through a supervisory control line in the Ethernet 230, a port hb2 of the hub Hb connects with a LAN port (in FIG. 11, Line port side) Lp2b of the repeater 240, and the repeater 240 connects with the subscriber terminal 250. Using the supervisory line L2b connected in this manner, the SNMP manager 220 acquires supervisory information in the repeater 240 located at a remote place.

There has also been proposed a network supervision technique in which, when monitoring an optical wavelength division multiplexing network, one wavelength is allocated to transmission of supervisory control signal to monitor network faults (e.g., Japanese Unexamined Patent Publication No. 2003-298540 (paragraph nos. [0022] to [0070]; FIG. 1)).

In the conventional network supervisory system explained with reference to FIG. 16, when the status of the remote, downstream-side repeater 240 is to be monitored through the upstream-side repeater 210, the supervisory control line L2b needs to be provided separately from the primary signal line L1. Accordingly, the conventional system requires the adjustment of a network interface environment to allow the connection of the supervisory line L2b, giving rise to a problem that the monitoring function cannot be easily introduced. Also, the separately provided supervisory line occupies LAN ports and hub ports for its own purpose, so that the number of idle ports decreases, causing disadvantages such as insufficiency of communication port resources for the primary signal.

In network supervisory control for TDM (Time Division Multiplex) systems such as ATM (Asynchronous Transfer Mode) systems and SDH (Synchronous Digital Hierarchy) systems, supervisory information is caused to enter the primary signal line, instead of separately providing a supervisory line, to perform supervisory control. Similar supervisory control is also performed in the aforementioned conventional technique (Japanese Unexamined Patent Publication No. 2003-298540) by allocating one wavelength to supervision.

However, in the conventional supervisory control wherein supervisory information is caused to enter the primary signal line, fixed timing or fixed slot or wavelength is allocated to supervision, with the result that part of the bandwidth originally allocated to users is always used as a supervisory bandwidth. If a fixed bandwidth is always secured for the supervisory information as in this supervisory control, the users' physical rate lowers by an amount corresponding to the supervisory bandwidth, posing a problem that the quality of service for the users lowers.

SUMMARY OF THE INVENTION

The present invention was created in view of the above circumstances, and an object thereof is to provide a frame transmission device which does not require a separate supervisory line and which enables supervisory frames to efficiently enter subscriber traffic for transmission without securing a fixed bandwidth.

To achieve the object, there is provided a frame transmission device for causing supervisory frames to enter subscriber traffic to be transmitted along with subscriber frames. The frame transmission device comprises a shared buffer having subscriber queues for storing subscriber frames and a supervisory queue for storing supervisory frames, a queue length management section for managing a supervisory queue length which is a length of the supervisory queue and subscriber queue lengths which are lengths of the respective subscriber queues, a supervisory token computing section capable of setting a minimum bandwidth for transmitting the supervisory frames and accumulating supervisory tokens for giving the supervisory frames permission to transmit within the set minimum bandwidth, the supervisory token computing section reducing the supervisory tokens in accordance with a result of queue read judgment, subscriber token computing sections associated with the respective subscriber queues and capable of optionally setting transmission bandwidths for the respective subscriber queues within a transmission bandwidth equal to a best-effort transmission bandwidth of the subscriber traffic minus the minimum bandwidth for the supervisory frames, the subscriber token computing sections accumulating subscriber tokens for giving the subscriber frames permission to transmit within the respective set transmission bandwidths and reducing the subscriber tokens in accordance with the queue read judgment result, a best-effort token computing section capable of setting the best-effort transmission bandwidth of the subscriber traffic and accumulating best-effort tokens for giving the supervisory frames or the subscriber frames permission to transmit by using an extra bandwidth and within the set best-effort transmission bandwidth, the best-effort token computing section reducing the best-effort tokens in accordance with the queue read judgment result, and a queue read control section for comparing the queue lengths with respective token storage amounts as the queue read judgment when reading the frames from the respective queues, wherein when the supervisory queue length is smaller than or equal to the supervisory token storage amount, the queue read control section permits the supervisory frames to transmit within the minimum bandwidth and reads and outputs supervisory frames corresponding to the supervisory queue length from the supervisory queue, when the subscriber queue length is smaller than or equal to the corresponding subscriber token storage amount, the queue read control section permits the subscriber frames to transmit within the transmission bandwidth set with respect to the corresponding subscriber queue and reads and outputs subscriber frames corresponding to the subscriber queue length from the corresponding subscriber queue, when the supervisory queue length is greater than the supervisory token storage amount and at the same time a remaining supervisory queue length in the supervisory queue obtained by subtracting the supervisory token storage amount from the supervisory queue length is smaller than or equal to the best-effort token storage amount, the queue read control section permits the supervisory frames to transmit by using the extra bandwidth and reads and outputs supervisory frames corresponding to the remaining supervisory queue length from the supervisory queue, and when the subscriber queue length is greater than the corresponding subscriber token storage amount and at the same time a remaining subscriber queue length in the corresponding subscriber queue obtained by subtracting the subscriber token storage amount from the subscriber queue length is smaller than or equal to the best-effort token storage amount, the queue read control section permits the subscriber frames to transmit by using the extra bandwidth and reads and outputs subscriber frames corresponding to the remaining subscriber queue length from the corresponding subscriber queue.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
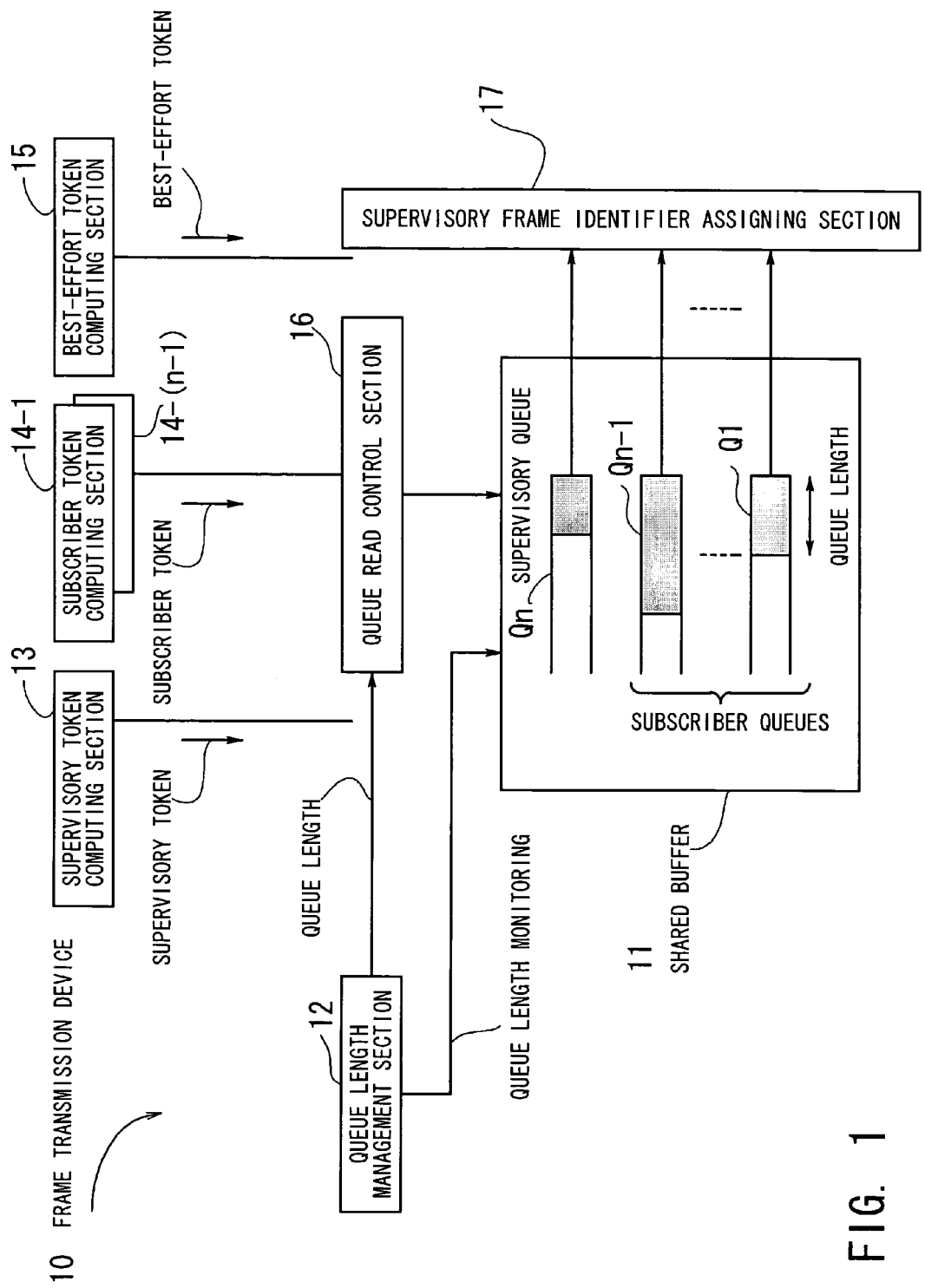
FIG. 1 is a diagram illustrating the principle of a frame transmission device according to the present invention.

Embodiments of the present invention will be hereinafter described with reference to the drawings. FIG. 1 illustrates the principle of a frame transmission device according to the present invention. The frame transmission device 10 comprises a shared buffer 11, a queue length management section 12, a supervisory token computing section 13, subscriber token computing sections 14-1 to 14-(n−1) (when referred to generically, subscriber token computing section 14), a best-effort token computing section 15, a queue read control section 16, and a supervisory frame identifier assigning section 17. The frame transmission device causes supervisory frames to enter subscriber traffic to be transmitted along with subscriber frames.

The shared buffer 11 includes n queues which are divided into subscriber queues Q1 to Qn−1 and a supervisory queue Qn. The subscriber queues Q1 to Qn−1 are queues for storing subscriber frames sorted according to their priority. The supervisory queue Qn is a queue for storing supervisory frames such as QoS supervisory information collected by the frame transmission device 10.

The queue length management section 12 monitors the lengths (queue lengths) of frames stored in the subscriber queues Q1 to Qn−1 or the supervisory queue Qn, and holds and manages the queue lengths of the respective queues.

The supervisory token computing section 13 is capable of setting a minimum bandwidth for transmitting the supervisory frames and accumulates supervisory tokens for giving permission to the supervisory frames stored in the supervisory queue Qn to transmit within the set minimum bandwidth. Also, in accordance with the result of queue read judgment made by the queue read control section 16, the supervisory token computing section reduces the supervisory tokens.

When 1 Mbps is set as the minimum bandwidth, for example, the supervisory token computing section 13 gives the queue read control section 16 permission (tokens; referred to herein as supervisory tokens) to read a maximum of 1 Mbps of supervisory frames from the supervisory queue Qn and transmit the frames.

The "minimum bandwidth" referred to herein means a bandwidth guaranteed as a minimum required bandwidth at which supervisory frames are sent out on the transmission line when supervisory information is generated.

The subscriber token computing sections 14-1 to 14-(n−1), which are associated with the respective subscriber queues Q1 to Qn−1, are capable of optionally setting (allocating) transmission bandwidths for the respective subscriber queues Q1 to Qn−1 within a transmission bandwidth equal to a best-effort transmission bandwidth of subscriber traffic minus the minimum bandwidth for the supervisory frames and accumulate subscriber tokens for giving permission to the subscriber frames stored in the respective subscriber queues Q1 to Qn−1 to transmit within the respective set transmission bandwidths. Also, in accordance with the result of queue read judgment made by the queue read control section 16, the subscriber token computing sections reduce the subscriber tokens.

Let it be assumed that the subscriber token computing sections 14-1 to 14-3 are associated with respective three subscriber queues Q1 to Q3, that the best-effort transmission bandwidth of the subscriber traffic is 100 Mbps (i.e., the bandwidth of a single transmission line for transmitting subscriber and supervisory frames is 100 Mbps), that the minimum bandwidth for the supervisory frames is 10 Mbps, and that the remaining 90 Mbps is divided such that the subscriber queues Q1 to Q3 are respectively allocated 40 Mbps, 30 Mbps, and 20 Mbps, for example.

In this case, the subscriber token computing section 14-1 gives the queue read control section 16 permission (tokens; referred to herein as subscriber tokens) to read a maximum of 40 Mbps of subscriber frames from the subscriber queue Q1 and transmit the frames. Similarly, the subscriber token computing section 14-2 gives the queue read control section 16 subscriber tokens for reading a maximum of 30 Mbps of subscriber frames from the subscriber queue Q2 and transmitting the frames, and the subscriber token computing section 14-3 gives the queue read control section 16 subscriber tokens for reading a maximum of 20 Mbps of subscriber frames from the subscriber queue Q3 and transmitting the frames.

The best-effort token computing section 15 is capable of setting the best-effort transmission bandwidth of the subscriber traffic and accumulates best-effort tokens for giving the supervisory or subscriber frames permission to transmit by using an extra bandwidth and within the set best-effort transmission bandwidth.

The best-effort transmission bandwidth is the sum of the minimum bandwidth set by the supervisory token computing section 13 and the transmission bandwidths set by the respective subscriber token computing sections 14-1 to 14-(n−1) (i.e., the bandwidth of the transmission line for transmitting the subscriber and supervisory frames).

Also, when the supervisory tokens are reduced by the supervisory token computing section 13, the best-effort token computing section 15 reduces the best-effort tokens by an amount equal to the amount of reduction of the supervisory tokens. Similarly, when the subscriber tokens are reduced by any of the subscriber token computing sections 14-1 to 14-(n−1), the best-effort token computing section 15 reduces the best-effort tokens by an amount equal to the amount of reduction of the subscriber tokens. Further, in accordance with the result of queue read judgment made by the queue read control section 16, the best-effort token computing section reduces the best-effort tokens.

The queue read control section 16 compares the queue lengths with respective token storage amounts as the queue read judgment when reading the frames from the respective queues. In accordance with the comparison results, the queue read control section reads frames from the respective queues and outputs the frames.

Let it be assumed here that the supervisory queue length is $M_L$, that the supervisory token storage amount is Tm, and that the best-effort token storage amount is BE. If the supervisory queue length is smaller than or equal to the supervisory token storage amount ($M_L \leq Tm$) (i.e., if the supervisory token computing section 13 can supply enough supervisory tokens), it is judged that the supervisory frames can be transmitted within the minimum bandwidth, and thus supervisory frames corresponding to the supervisory queue length $M_L$ are read from the supervisory queue Qn and output.

In this case, the supervisory queue length $M_L$ is subtracted from the supervisory token storage amount Tm in the supervisory token computing section 13, and the supervisory queue length $M_L$ is subtracted from the best-effort token storage amount BE in the best-effort token computing section 15.

Let it also be assumed that the subscriber queue length of an optional subscriber queue is $N_L$, that the corresponding subscriber token storage amount is Tn, and that the best-effort token storage amount is BE. If the subscriber queue length is smaller than or equal to the subscriber token storage amount ($N_L \leq Tn$) (i.e., if the subscriber token computing section 14 can supply enough subscriber tokens), it is judged that the subscriber frames can be transmitted within the transmission bandwidth set for the subscriber queue concerned, and thus subscriber frames corresponding to the subscriber queue length $N_L$ are read from the corresponding subscriber queue and output.

In this case, the subscriber queue length $N_L$ is subtracted from the subscriber token storage amount Tn in the subscriber token computing section 14, and the subscriber queue length $N_L$ is subtracted from the best-effort token storage amount BE in the best-effort token computing section 15.

On the other hand, if the supervisory queue length is greater than the supervisory token storage amount ($M_L > Tm$) and at the same time a remaining supervisory queue length $M_L 1$ ($=M_L-Tm$) in the supervisory queue obtained by subtracting the supervisory token storage amount from the supervisory queue length is smaller than or equal to the best-effort token storage amount ($M_L 1 \leq BE$) (i.e., if the supervisory token computing section 13 is unable to supply supervisory tokens for all of the frame information in the supervisory queue Qn but the best-effort token computing section 15 can supply enough best-effort tokens for the remaining frame information (supervisory queue length $M_L1$) that failed to receive supervisory tokens), it is judged that the supervisory frames can be transmitted by using an extra bandwidth (bandwidth indicated by the best-effort token storage amount), and thus the supervisory frames are read from the supervisory queue Qn and output.

In this case, the supervisory tokens Tm that the supervisory token computing section 13 could supply and the supervisory queue length $M_L1$ are subtracted from the best-effort token storage amount BE in the best-effort token computing section 15 (since the queue length $M_L$ was read from the supervisory queue Qn after all, $M_L$ is subtracted from BE). Also, the subtraction Tm−$M_L$ is performed in the supervisory token computing section 13, which therefore shows a negative counter value.

Further, if the subscriber queue length is greater than the subscriber token storage amount ($N_L$>Tn) and at the same time a remaining subscriber queue length $N_L1$ (=$N_L$−Tn) in the subscriber queue obtained by subtracting the subscriber token storage amount from the subscriber queue length is smaller than or equal to the best-effort token storage amount ($N_L1 \leq BE$) (i.e., if the subscriber token computing section 14 is unable to supply subscriber tokens for all of the frame information in the corresponding subscriber queue but the best-effort token computing section 15 can supply enough best-effort tokens for the remaining frame information (subscriber queue length $N_L1$) that failed to receive subscriber tokens), it is judged that the subscriber frames can be transmitted by using the extra bandwidth, and thus the subscriber frames are read from the corresponding subscriber queue and output.

In this case, the subscriber tokens Tn that the subscriber token computing section 14 could supply and the subscriber queue length $N_L1$ are subtracted from the best-effort token storage amount BE in the best-effort token computing section 15 (since the queue length $N_L$ was read from the corresponding subscriber queue after all, $N_L$ is subtracted from BE). Also, the subtraction Tn−$N_L$ is performed in the subscriber token computing section 14, which therefore shows a negative counter value.

Figure 2:
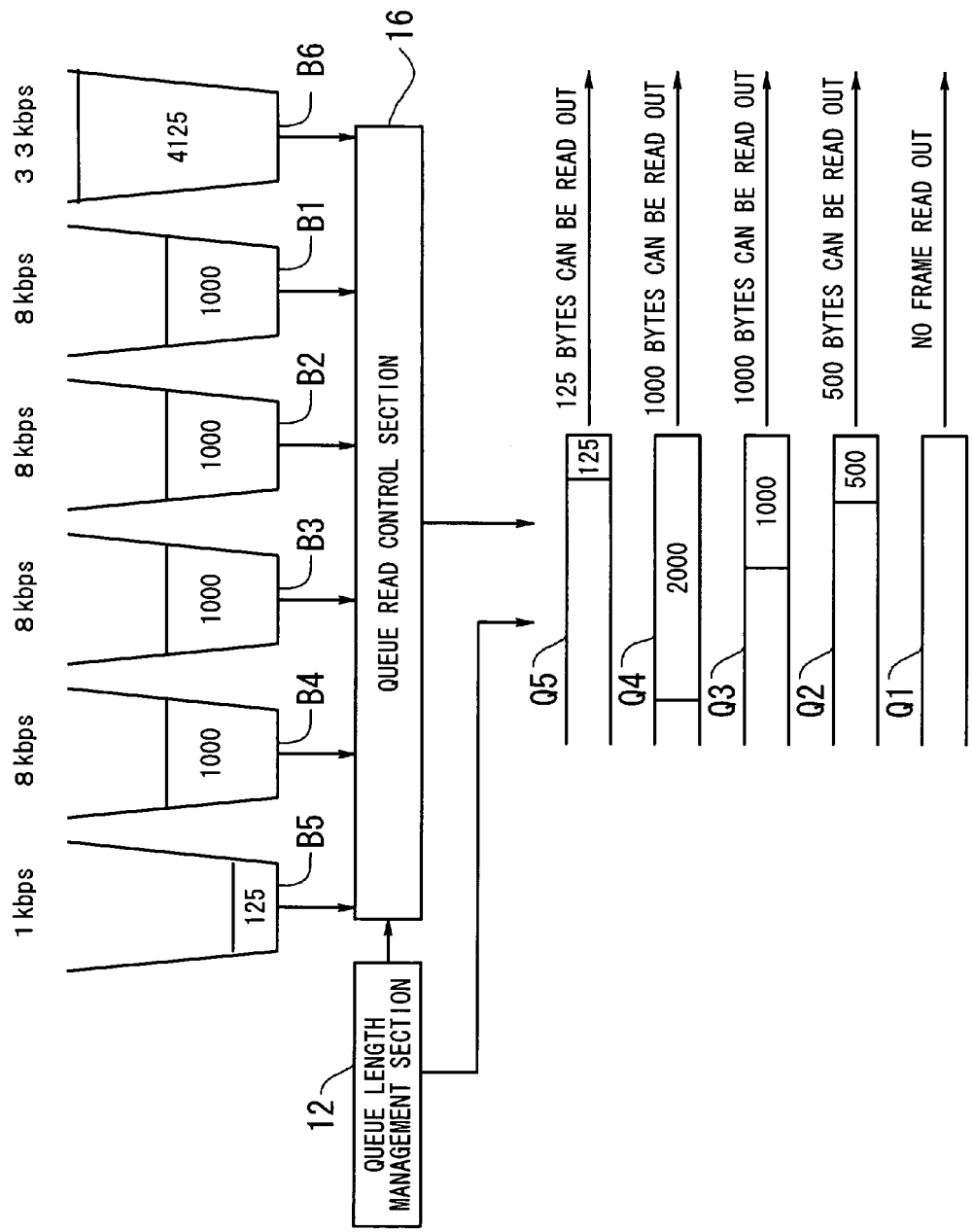
FIG. 2 is a diagram illustrating the operational relationship between queue lengths and token storage amounts.
Figure 3:
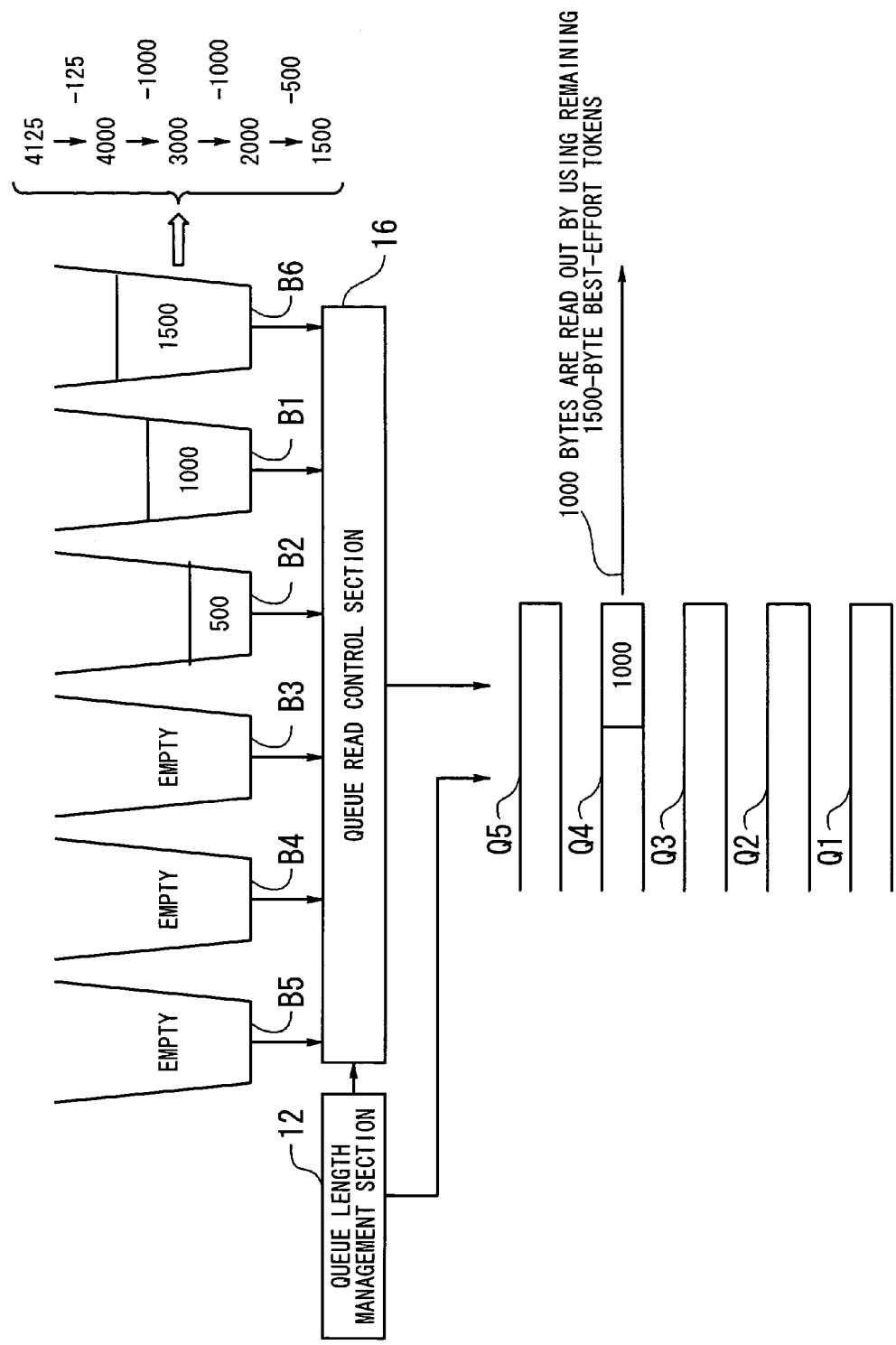
FIG. 3 is a diagram also illustrating the operational relationship between queue lengths and token storage amounts.

Referring now to FIGS. 2 and 3, the operational relationship between queue lengths and token storage amounts will be explained in detail by using specific numerical values. The present invention uses a token bucket technique, which is a traffic control mechanism, to cause supervisory frames to enter the subscriber traffic to be transmitted along with subscriber frames.

FIGS. 2 and 3 illustrate the operational relationship between queue lengths and token storage amounts, wherein FIG. 2 shows a state before queue read and FIG. 3 shows a state after queue read.

It is assumed that there are four subscriber queues Q1 to Q4 and one supervisory queue Q5. A supervisory token bucket B5 corresponds to the supervisory token computing section 13, subscriber token buckets B1 to B4 correspond to the subscriber token computing sections 14-1 to 14-4, respectively, and a best-effort token bucket B6 corresponds to the best-effort token computing section 15.

For the supervisory token bucket B5, 1 kbps is set as the minimum bandwidth, and for the subscriber token buckets B1 to B4, 8 kbps is set as the transmission bandwidth for each queue. Namely, the supervisory token bucket B5 is supplied with 125 bytes of supervisory tokens per second (1 kbps). Each of the subscriber token buckets B1 to B4 is supplied with 1000 bytes of subscriber tokens per second (8 kbps).

For the best-effort token bucket B6, the sum of the minimum bandwidth of 1 kbps and the transmission bandwidths of the subscriber queues Q1 to Q4 (8 kbps each), that is, 33 kbps, is set as the best-effort transmission bandwidth (this means that the bandwidth of the transmission line is 33 kbps). Namely, the best-effort token bucket B6 is supplied with 4125 bytes of best-effort tokens per second (33 kbps).

Let it be assumed here that the queue lengths of the subscriber queues Q1 to Q4 are 0 bytes, 500 bytes, 1000 bytes and 2000 bytes, respectively, and that the queue length of the supervisory queue Q5 is 125 bytes.

The queue lengths are monitored by the queue length management section 12, and the queue read control section 16 is notified of the monitoring results. On receiving the queue length monitoring results, the queue read control section 16 makes a queue read judgment. In this instance, the queue read judgment is made in order of Q5→Q4→Q3→Q2→Q1 (the order of making the queue read judgment is optional and the order of priority is determined beforehand).

In the case of the supervisory queue Q5, the supervisory queue length is 125 bytes and the supervisory token storage amount of the supervisory token bucket B5 is 125 bytes. Accordingly, the supervisory queue Q5 is given supervisory tokens as permission to transmit 125 bytes, and thus 125-byte supervisory frames are read from the supervisory queue Q5 and output (since the supervisory frames are forwarded by giving permission to transmit 125 bytes per second, the communication bandwidth for the supervisory frames is, at this time, 1 kbps).

Since supervisory tokens corresponding to 125 bytes have been given, the supervisory token bucket B5 becomes empty, and 125 bytes, which is equivalent to the supervisory tokens given, is subtracted from the best-effort token bucket B6. Accordingly, the best-effort token storage amount of the best-effort token bucket B6 is, at this time, 4000 (=4125−125) bytes.

In the case of the subscriber queue Q4, the subscriber queue length is 2000 bytes and the subscriber token storage amount of the subscriber token bucket B4 is 1000 bytes. Accordingly, the subscriber queue Q4 is given subscriber tokens as permission to transmit 1000 bytes, and thus 1000-byte subscriber frames are read from the subscriber queue Q4 and output (1000-byte frame information remains in the subscriber queue Q4).

Since subscriber tokens corresponding to 1000 bytes have been given, the subscriber token bucket B4 becomes empty, and 1000 bytes, which is equivalent to the subscriber tokens given, is subtracted from the best-effort token bucket B6. Accordingly, the best-effort token storage amount of the best-effort token bucket B6 is, at this time, 3000 (=4000−1000) bytes.

In the case of the subscriber queue Q3, the subscriber queue length is 1000 bytes and the subscriber token storage amount of the subscriber token bucket B3 is 1000 bytes. Accordingly, the subscriber queue Q3 is given subscriber tokens as permission to transmit 1000 bytes, and thus 1000-byte subscriber frames are read from the subscriber queue Q3 and output.

Since subscriber tokens corresponding to 1000 bytes have been given, the subscriber token bucket B3 becomes empty, and 1000 bytes, which is equivalent to the subscriber tokens given, is subtracted from the best-effort token bucket B6. Accordingly, the best-effort token storage amount of the best-effort token bucket B6 is, at this time, 2000 (=3000−1000) bytes.

In the case of the subscriber queue Q2, the subscriber queue length is 500 bytes and the subscriber token storage amount of the subscriber token bucket B2 is 1000 bytes. Accordingly, the subscriber queue Q2 is given subscriber tokens as permission to transmit 500 bytes, and thus 500-byte subscriber frames are read from the subscriber queue Q2 and output.

Since subscriber tokens corresponding to 500 bytes have been given, 500-byte tokens remain in the subscriber token bucket B2, and 500 bytes, which is equivalent to the subscriber tokens given, is subtracted from the best-effort token bucket B6. Accordingly, the best-effort token storage amount of the best-effort token bucket B6 is, at this time, 1500 (=2000−500) bytes.

In the case of the subscriber queue Q1, the subscriber queue length is 0 bytes and the subscriber token storage amount of the subscriber token bucket B1 is 1000 bytes. Since the queue length of the subscriber queue Q1 is 0, no queue read operation is performed.

Thus, frames are read from the respective queues by using the token storage amounts of the supervisory token bucket B5 and subscriber token buckets B4 to B1. In this instance, 1000 bytes still remains in the subscriber queue Q4. In such cases, the remaining amount is compared with the best-effort token storage amount to continue the queue read operation.

Specifically, the queue length of the subscriber queue Q4 is 1000 bytes and the subscriber token bucket B4 is empty, while the best-effort token storage amount of the best-effort token bucket B6 is 1500 bytes. Accordingly, the subscriber queue Q4 can be given subscriber tokens as permission to transmit 1000 bytes, and thus 1000-byte subscriber frames are read from the subscriber queue Q4 and output. At this time, since subscriber tokens corresponding to 1000 bytes have been given, 500 bytes remains in the best-effort token bucket B6. (Although the token storage amount of the subscriber token bucket B4 is zero, subtraction is performed. Namely, 1000 bytes is subtracted from 0 bytes, resulting in a negative counter value of −1000 bytes.)

As a result of the above subscriber queue read process performed in a unit time, 2000 bytes is read from the subscriber queue Q4, 1000 bytes from the subscriber queue Q3, and 500 bytes from the subscriber queue Q2. Thus, a total of 3500-byte subscriber frames is forwarded in a second, and the communication bandwidth for the subscriber frames is, at this time, 28 kbps (this means that supervisory frames with a communication bandwidth of 1 kbps and subscriber frames with a communication bandwidth of 28 kbps are forwarded through the transmission line having a bandwidth of 33 kbps).

As described above, according to the present invention, supervisory tokens, for which a minimum bandwidth has been set, are used for the supervisory queue read control, thereby guaranteeing the minimum bandwidth for the supervisory frames. Also, subscriber tokens, for which is set a transmission bandwidth divided among subscriber queues, are used for the individual subscriber queue read control, thereby guaranteeing a communication bandwidth (CIR: Committed Information Rate) at which subscriber frames are allowed to flow constantly.

If the supervisory or subscriber tokens are not enough to read frames from the queue, best-effort tokens are used for the queue read control to read the frames. Namely, if there is information remaining in a queue in excess of the originally set communication bandwidth, the remaining information is forwarded by using an extra bandwidth (this means that best-effort communication is performed).

According to the present invention, a minimum bandwidth is set for supervisory information that is irregularly generated, and accordingly, when supervisory information is generated, supervisory frames carrying the generated information can be transmitted by using the minimum bandwidth. This prevents a situation where the supervisory control line is cut off. Also, unlike the conventional system, the bandwidth allocated to supervisory frames is not fixed. When no supervisory frame is transmitted, therefore, the whole extra bandwidth can be allocated to subscribers by means of best-effort tokens, making it possible to solve the problem of degradation in quality of service for users.

Further, while the transmission bandwidth which is equal to the bandwidth of the transmission line minus the minimum bandwidth is not fully occupied by the subscriber traffic, the extra bandwidth of best-effort tokens can be allocated to supervisory frames, thus making it possible to transmit supervisory frames with a communication bandwidth higher than the minimum bandwidth.

Figure 4:
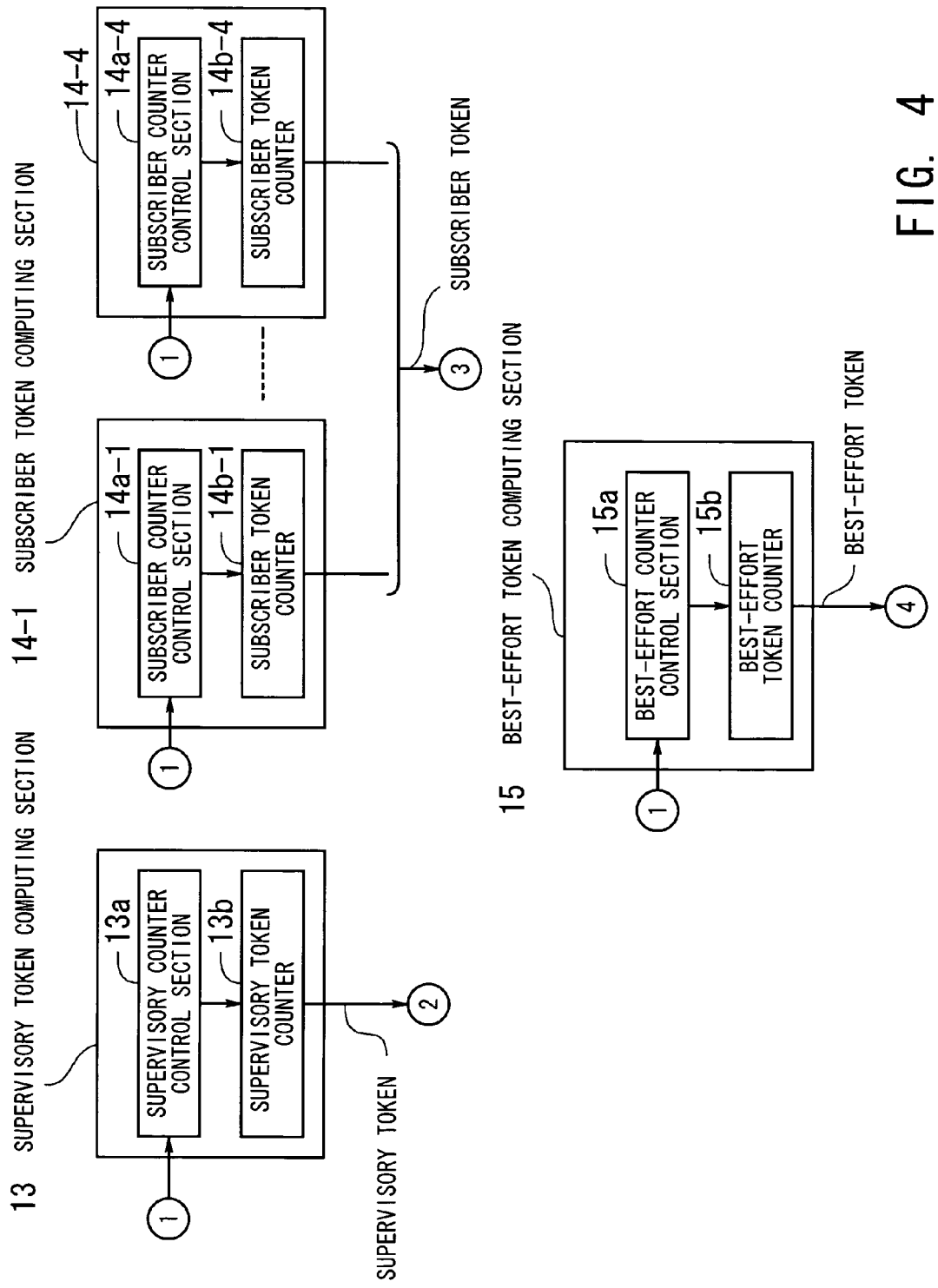
FIG. 4 is a diagram showing the configuration of the frame transmission device.
Figure 5:
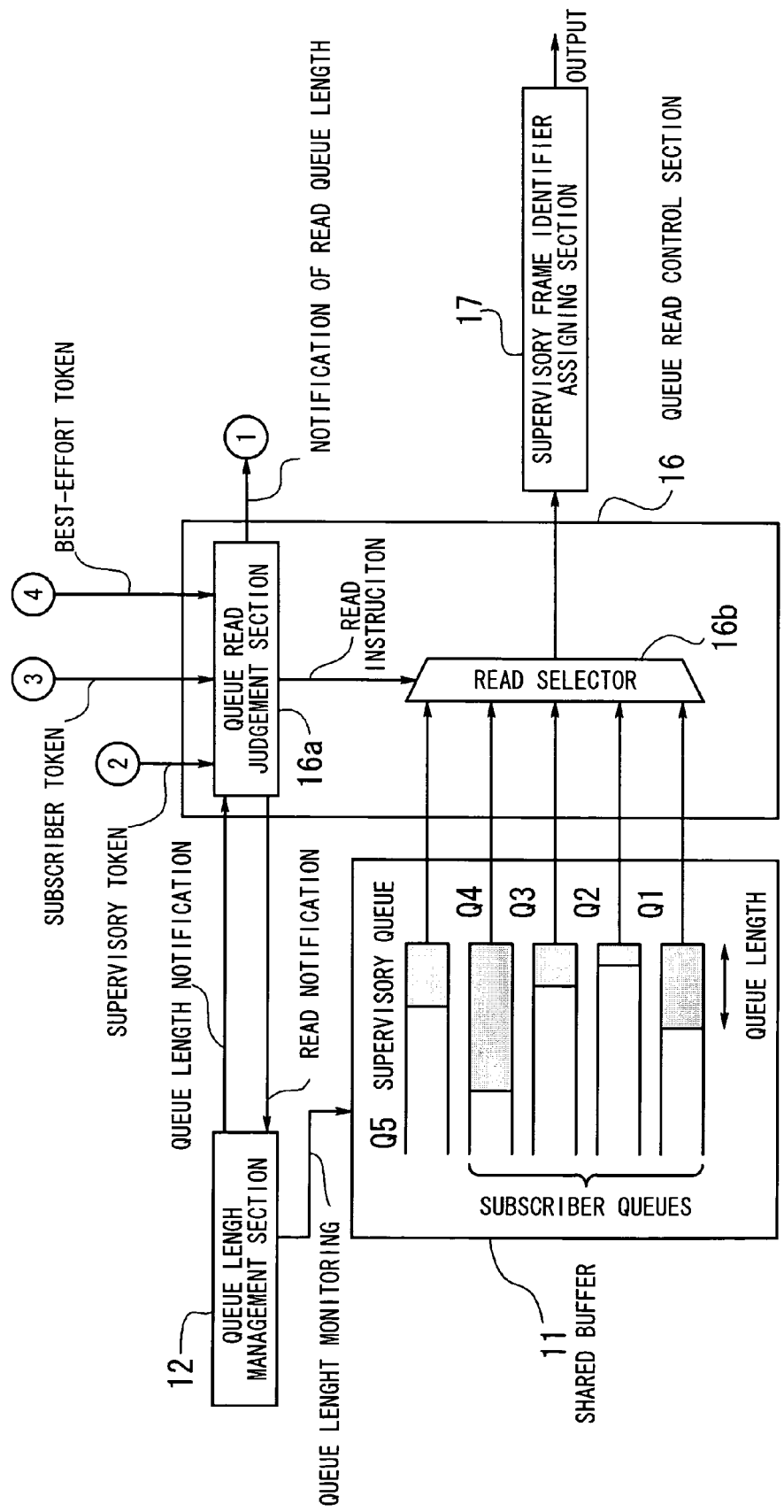
FIG. 5 is a diagram also showing the configuration of the frame transmission device.

An exemplary configuration of the frame transmission device 10 will be now described. FIGS. 4 and 5 show the configuration of the frame transmission device 10. It is assumed here that the shared buffer 11 includes four subscriber queues Q4 to Q1 and one supervisory queue Q5. The supervisory token computing section 13 includes a supervisory counter control section 13a and a supervisory token counter 13b. The subscriber token computing sections 14-1 to 14-4 include subscriber counter control sections 14a-1 to 14a-4 and subscriber token counters 14b-1 to 14b-4, respectively. The best-effort token computing section 15 includes a best-effort counter control section 15a and a best-effort token counter 15b. The queue read control section 16 includes a queue read judgment section 16a and a read selector 16b. In the following, the individual elements will be explained.

The supervisory queue Q5 stores supervisory frames, and the subscriber queues Q1 to Q4 store subscriber data classified according to priority levels. The queue length management section 12 monitors the subscriber queues Q1 to Q4 and the supervisory queue Q5 for next read queue lengths to be output next, and stores the monitoring results in its internal registers associated with the respective queues.

In the supervisory token computing section 13, the supervisory counter control section 13a controls the addition/subtraction performed by the supervisory token counter 13b. Specifically, the supervisory counter control section 13a periodically generates supervisory tokens corresponding to the set minimum bandwidth, and outputs the tokens to the supervisory token counter 13b. Also, on receiving notification of a read queue length from the queue read judgment section 16a, the supervisory counter control section outputs the received queue length value to the supervisory token counter 13b.

The supervisory token counter 13b is an up-down counter and, on receiving supervisory tokens from the supervisory counter control section 13a, adds the received supervisory tokens to the current counter value. Since the maximum (MUX) value of the counter equals the value corresponding to the set minimum bandwidth, however, the counter value never exceeds this value.

Also, on receiving a queue length from the supervisory counter control section 13a, the supervisory token counter 13b subtracts the queue length from the current counter value. For example, if the current counter value is 8 kbps (1000 bytes) and the notified queue length of the supervisory queue Q5 is 125 bytes, 125 bytes is subtracted from 1000 bytes, so that the counter value becomes 7 kbps (875 bytes).

In the subscriber token computing section 14-1 (only the subscriber token computing section 14-1 will be explained since the other subscriber token computing sections 14-2 to 14-4 also have the same configuration), the subscriber counter control section 14a-1 controls the addition/subtraction performed by the subscriber token counter 14b-1. Specifically, the subscriber counter control section 14a-1 periodically generates subscriber tokens corresponding to the set transmission bandwidth, and outputs the tokens to the subscriber token counter 14b-1. Also, on receiving notification of a read queue length from the queue read judgment section 16a, the subscriber counter control section outputs the received queue length value to the subscriber token counter 14b-1.

The subscriber token counter 14b-1 is an up-down counter and, on receiving subscriber tokens from the subscriber counter control section 14a-1, adds the received subscriber tokens to the current counter value. Since the maximum (MUX) value of the counter equals the value corresponding to the set transmission bandwidth, however, the counter value never exceeds this value.

Also, on receiving a queue length from the subscriber counter control section 14a-1, the subscriber token counter 14b-1 subtracts the received queue length value from the current counter value.

In the best-effort token computing section 15, the best-effort counter control section 15a controls the addition/subtraction performed by the best-effort token counter 15b. Specifically, the best-effort counter control section 15a periodically generates best-effort tokens corresponding to the set best-effort transmission bandwidth, and outputs the tokens to the best-effort token counter 15b. Also, on receiving notification of a read queue length from the queue read judgment section 16a, the best-effort counter control section outputs the received queue length value to the best-effort token counter 15b.

The best-effort token counter 15b is an up-down counter and, on receiving best-effort tokens from the best-effort counter control section 15a, adds the received best-effort tokens to the current counter value. Since the maximum (MUX) value of the counter equals the value corresponding to the set best-effort transmission bandwidth, however, the counter value never exceeds this value.

Also, on receiving a queue length from the best-effort counter control section 15a, the best-effort token counter 15b subtracts the queue length value from the current counter value.

On receiving notification of each queue length from the queue length management section 12, the queue read judgment section 16a of the queue read control section 16 compares the queue length with the corresponding token storage amount (the comparison process is described above and thus explanation thereof is omitted) by way of queue read judgment for reading frames from the queue. In accordance with the comparison result, the queue read judgment section supplies the read selector 16b with an instruction to read frames from the corresponding queue, and also notifies the corresponding token computing section of the read queue length. The read selector 16b reads frames from the corresponding queue as instructed.

The supervisory frame identifier assigning section 17 assigns a supervisory frame identifier to each received frame if the frame is a supervisory frame, to permit supervisory frames to be distinguished from subscriber frames, and outputs the frames.

The following describes the correction of field information in relation to the bandwidth setting by a token bucket.

In the case of MAC frame (IEEE format), for example, the frame input to the shared buffer 11 does not have IFG (Inter Frame Gap), SFD (Start Frame Delimiter), preamble, FCS (Frame Check Sequence), etc. because these fields are removed in a preprocessing section for the sake of internal processing before the frame reaches the shared buffer 11. Accordingly, in order for the frame to be output in final form, the once removed field information needs to be again affixed to the frame at a final output point.

In the foregoing explanation with reference to FIGS. 1 to 5, the transmission bandwidths are set by token buckets directly with respect to the frames input to the shared buffer 11. In practice, however, control needs to be performed taking account of the above field information, as explained below.

Figure 6:
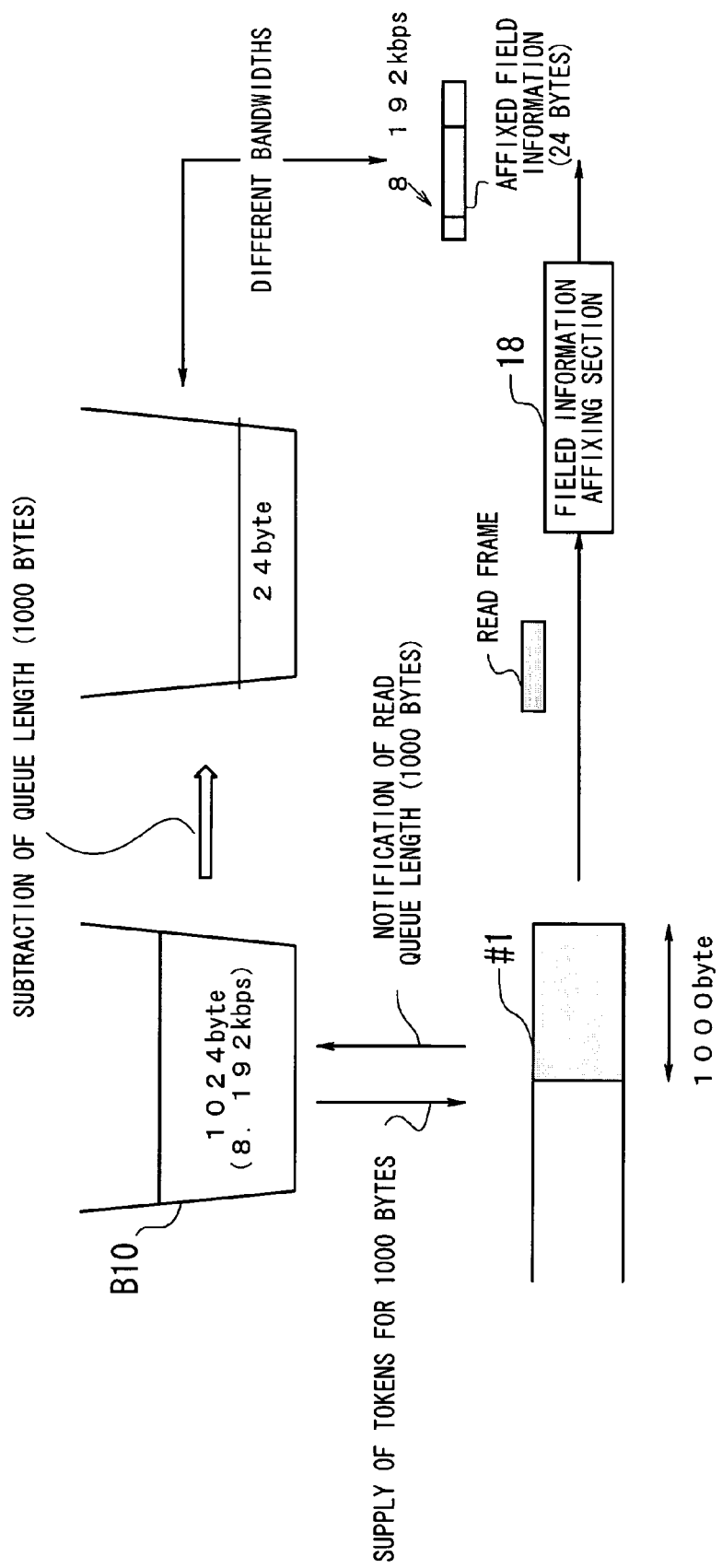
FIG. 6 is a diagram illustrating correction of field information.
Figure 7:
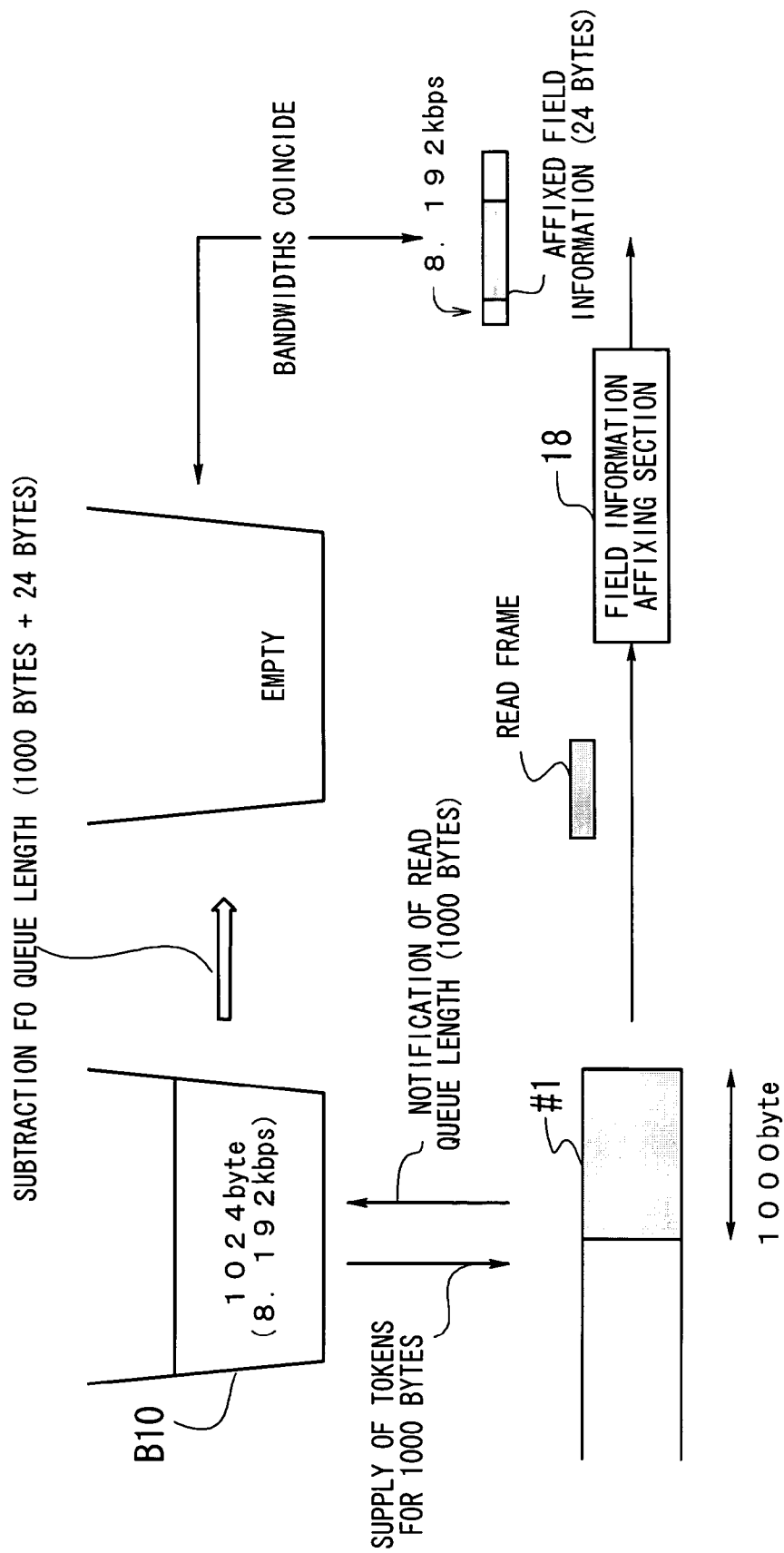
FIG. 7 is a diagram also illustrating the correction of field information.

FIGS. 6 and 7 illustrate the correction of the field information. A queue #1 stores 1000-byte frame information and 8.192 kbps (corresponding to a token storage amount of 1024 bytes) is set as the transmission bandwidth of a token bucket B10. A field information affixing section 18 affixes field information to the frame from which the field information has been removed in the preprocessing section before the frame reaches the queue #1, for adjustment of the field information at the time of output from the device. In this instance, the field information to be affixed includes IFG (12), SFD (1), preamble (7) and FCS (4), the parenthesized numbers indicating data lengths in bytes.

FIG. 6 shows the case where the field information is not corrected. Since the queue #1 stores 1000-byte frame information, tokens corresponding to 1000 bytes may be given to the queue #1 from the token bucket B10 to read the frame from the queue #1. After the tokens are given, the queue length of 1000 bytes is subtracted from the token bucket B10 and thus 24 bytes remains.

The frame read from the queue #1 is input to the field information affixing section 18 and affixed with a total of 24 bytes of field information, so that the resultant 1024-byte frame is output from the device.

The final communication bandwidth at the output side of the device is 8.192 kbps, and this should originally mean that tokens for 1024 bytes, which correspond to 8.192 kbps, had been supplied from the token bucket B10, emptying the bucket. In actuality, however, 24 bytes remains and 8 kbps was set as the bandwidth on the side of the token bucket B10.

In this manner, if the frame correction explained below with reference to FIG. 7 is not performed, there arises a difference between the bandwidth set by the token bucket B10 and the bandwidth at the final output stage, causing inconveniences during operation.

FIG. 7 shows the case where the field information is adjusted. To solve the above problem, the sum of the queue length and the length of the field information to be affixed at the final output stage may be subtracted from the token storage amount when the subtraction of tokens is performed.

Namely, the queue #1 stores 1000 bytes and thus the token bucket B10 gives tokens corresponding to 1000 bytes. When the queue length is subtracted from the token storage amount, however, the sum of the queue length of 1000 bytes and 24 bytes, that is, 1024 bytes, is subtracted. This makes the token bucket B10 empty, which is equivalent to a situation where the token bucket B10 set a bandwidth equal to 8.192 kbps at the final output stage.

The correction process described above eliminates the difference between the bandwidth set by the token bucket B10 and the bandwidth at the final output stage and makes the two equal to each other. (Where the correction process like this is performed, it may be appropriate to say that the queue itself withdraws tokens as transmission permission that are needed up to the final output stage, from the token bucket, rather than that the token bucket gives tokens to the queue as transmission permission.)

In the above instance, IFG, SED, preamble and FCS are included in the field information. In the case where VLAN tag (4 bytes) is additionally affixed by the field information affixing section 18, the length (queue length+24 bytes+4 bytes) may be subtracted from the token storage amount. Similar field information correction can be performed not only on MAC frames mentioned above, but also on various other frames and field information.

Figure 8:
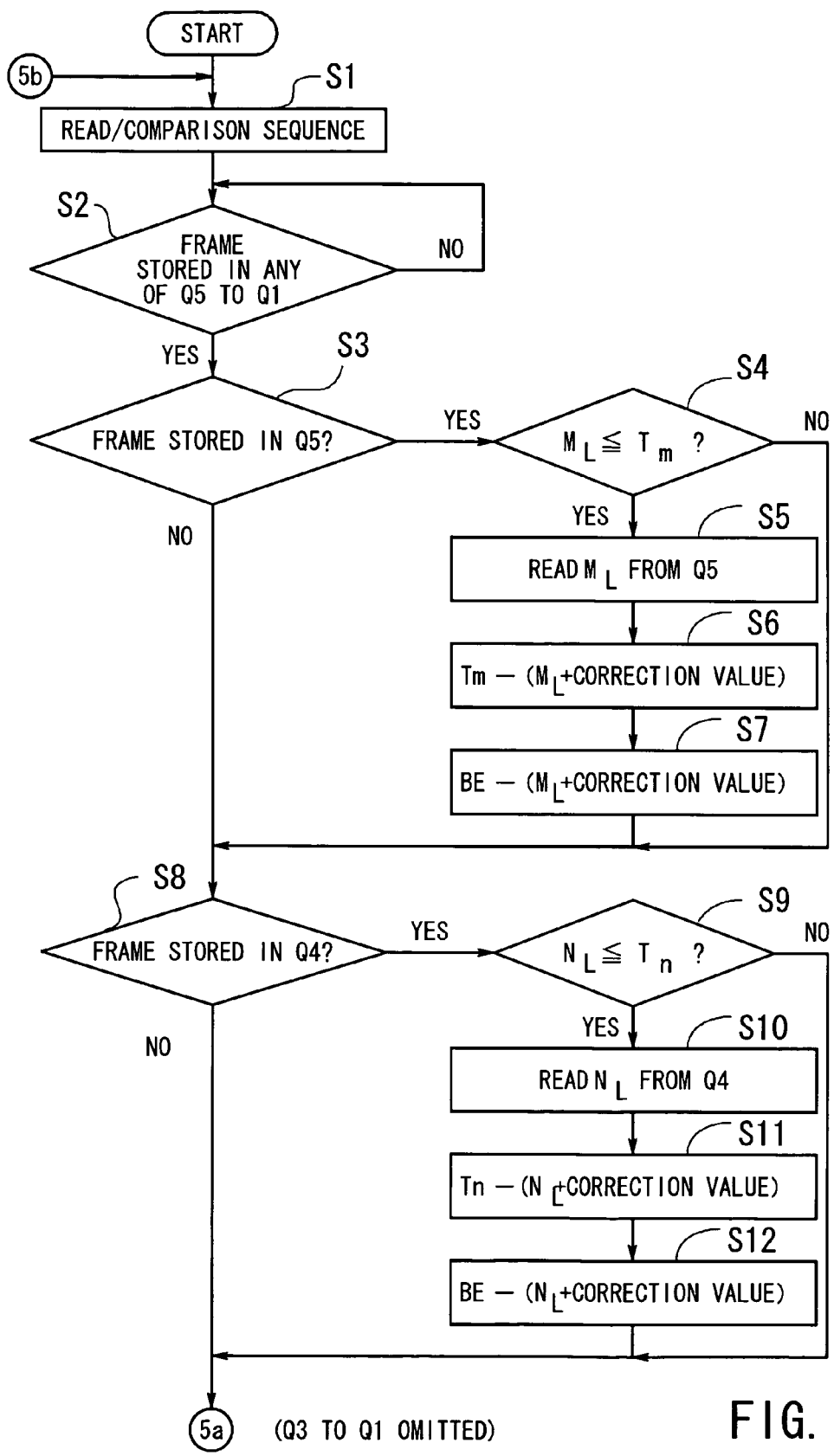
FIG. 8 is a flowchart showing queue read control operation.
Figure 9:
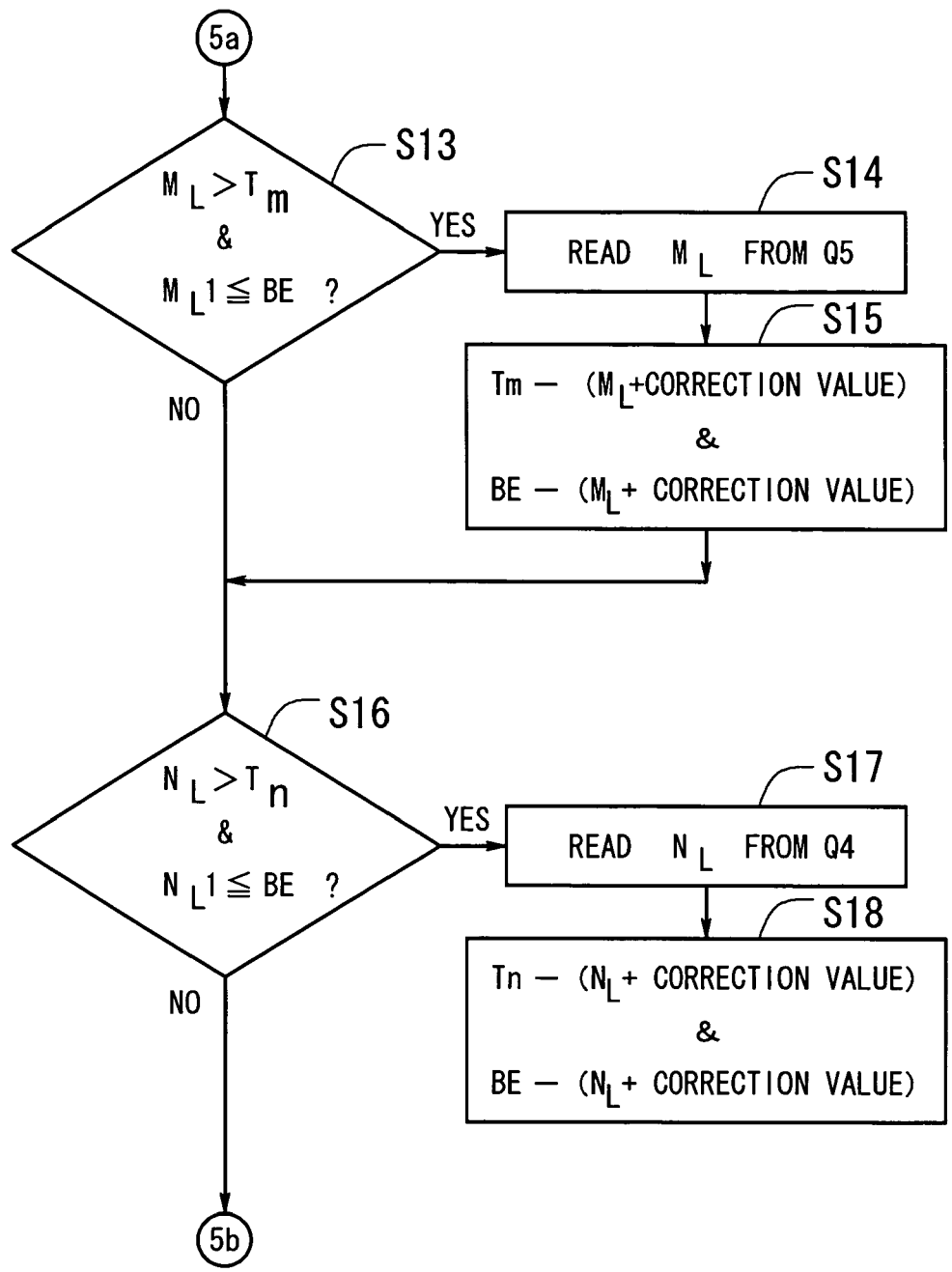
FIG. 9 is a flowchart also showing the queue read control operation.

The queue read control operation of the queue read control section 16 will be now described with reference to the flowchart shown in FIGS. 8 and 9. In the case where there are one supervisory queue Q5 and four subscriber queues Q1 to Q4 and frames are stored in these queues, the frames are read out according to their priority levels, for example, in order of Q5→Q4→Q3→Q2→Q1. In the following, the read process for Q5 and Q4 alone will be explained.

[S1] The process enters read/comparison sequence.

[S2] It is determined whether a next read frame is set in any of the queues Q5 to Q1. If there is no next read frame in the queues, search for next read frame is repeated. If a next read frame is set in any of the queues, the process proceeds to Step S3.

[S3] It is determined whether a frame is stored in the supervisory queue Q5. If a frame is stored in the supervisory queue, the process proceeds to Step S4; if not, the process proceeds to Step S8.

[S4] If the supervisory queue length $M_L$ is smaller than or equal to the supervisory token storage amount Tm ($M_L \leq$ Tm), the process proceeds to Step S5; if not, the process proceeds to Step S8.

[S5] The frame with the supervisory queue length $M_L$ is read from the supervisory queue Q5.

[S6] Notification of the read queue length is sent to the supervisory token computing section 13, which then subtracts the sum of the read queue length and a correction value from the supervisory token storage amount Tm (Tm−($M_L$+correction value)). The correction value represents the number of bytes or bits of the field information, VLAN tag, etc. explained with reference to FIGS. 6 and 7.

[S7] Notification of the read queue length is sent to the best-effort token computing section 15, which then subtracts the sum of the read queue length and the correction value from the best-effort token storage amount BE (BE−($M_L$+correction value)).

[S8] It is determined whether a frame is stored in the subscriber queue Q4. If a frame is stored in the subscriber queue Q4, the process proceeds to Step S9; if not, the process proceeds to Step S13.

[S9] If the subscriber queue length $N_L$ is smaller than or equal to the subscriber token storage amount Tn ($N_L \leq$ Tn), the process proceeds to Step S10; if not, the process proceeds to Step S13.

[S10] The frame with the subscriber queue length $N_L$ is read from the subscriber queue Q4.

[S11] Notification of the read queue length is sent to the subscriber token computing section 14, which then subtracts the sum of the read queue length and the correction value from the subscriber token storage amount Tn (Tn−($N_L$+correction value)).

[S12] Notification of the read queue length is sent to the best-effort token computing section 15, which then subtracts the sum of the read queue length and the correction value from the best-effort token storage amount BE (BE−($N_L$+correction value)). The same operation as described above is performed thereafter on the subscriber queues Q3 to Q1 (explanation thereof is omitted).

[S13] It is determined whether the following two conditions are simultaneously fulfilled or not, namely, the condition that the supervisory queue length $M_L$ is greater than the supervisory token storage amount Tm ($M_L$>Tm), and the condition that a remaining supervisory queue length $M_L 1$ (=$M_L$−Tm) in the supervisory queue obtained by subtracting the supervisory token storage amount from the supervisory queue length is smaller than or equal to the best-effort token storage amount ($M_L 1 \leq$ BE). If these conditions are fulfilled, the process proceeds to Step S14; if not, the process proceeds to Step S16.

[S14] The frame with the supervisory queue length $M_L$ is read from the supervisory queue Q5.

[S15] Notification of the read queue length is sent to the supervisory token computing section 13, which then subtracts the sum of the read queue length and the correction value from the supervisory token storage amount Tm (Tm−($M_L$+correction value)). Subsequently, notification of the read queue length is sent to the best-effort token computing section 15, which then subtracts the sum of the read queue length and the correction value from the best-effort token storage amount BE (BE−($M_L$+correction value)).

[S16] It is determined whether the following two conditions are simultaneously fulfilled or not, namely, the condition that the subscriber queue length $N_L$ is greater than the subscriber token storage amount Tn ($N_L$>Tn), and the condition that a remaining subscriber queue length $N_L 1$ (=$N_L$−Tn) in the subscriber queue obtained by subtracting the subscriber token storage amount from the subscriber queue length is smaller than or equal to the best-effort token storage amount ($N_L 1 \leq$ BE). If these conditions are fulfilled, the process proceeds to Step S17; if not, the process returns to Step S1.

[S17] The frame with the subscriber queue length $N_L$ is read from the subscriber queue Q4.

[S18] Notification of the read queue length is sent to the subscriber token computing section 14, which then subtracts the sum of the read queue length and the correction value from the subscriber token storage amount Tn (Tn−($N_L$+correction value)). Subsequently, notification of the read queue length is sent to the best-effort token computing section 15, which then subtracts the sum of the read queue length and the length of the field information from the best-effort token storage amount BE (BE−($N_L$+field information length)).

The supervisory frame identifier assigning section 17 of the present invention will be now described. The supervisory frame identifier assigning section 17 assigns a supervisory frame identifier to each supervisory frame to permit supervisory frames to be distinguished from subscriber frames. For example, VLAN tag is used as the supervisory frame identifier. By using the VLAN tag, it is also possible to perform 1:n network supervision.

Figure 10:
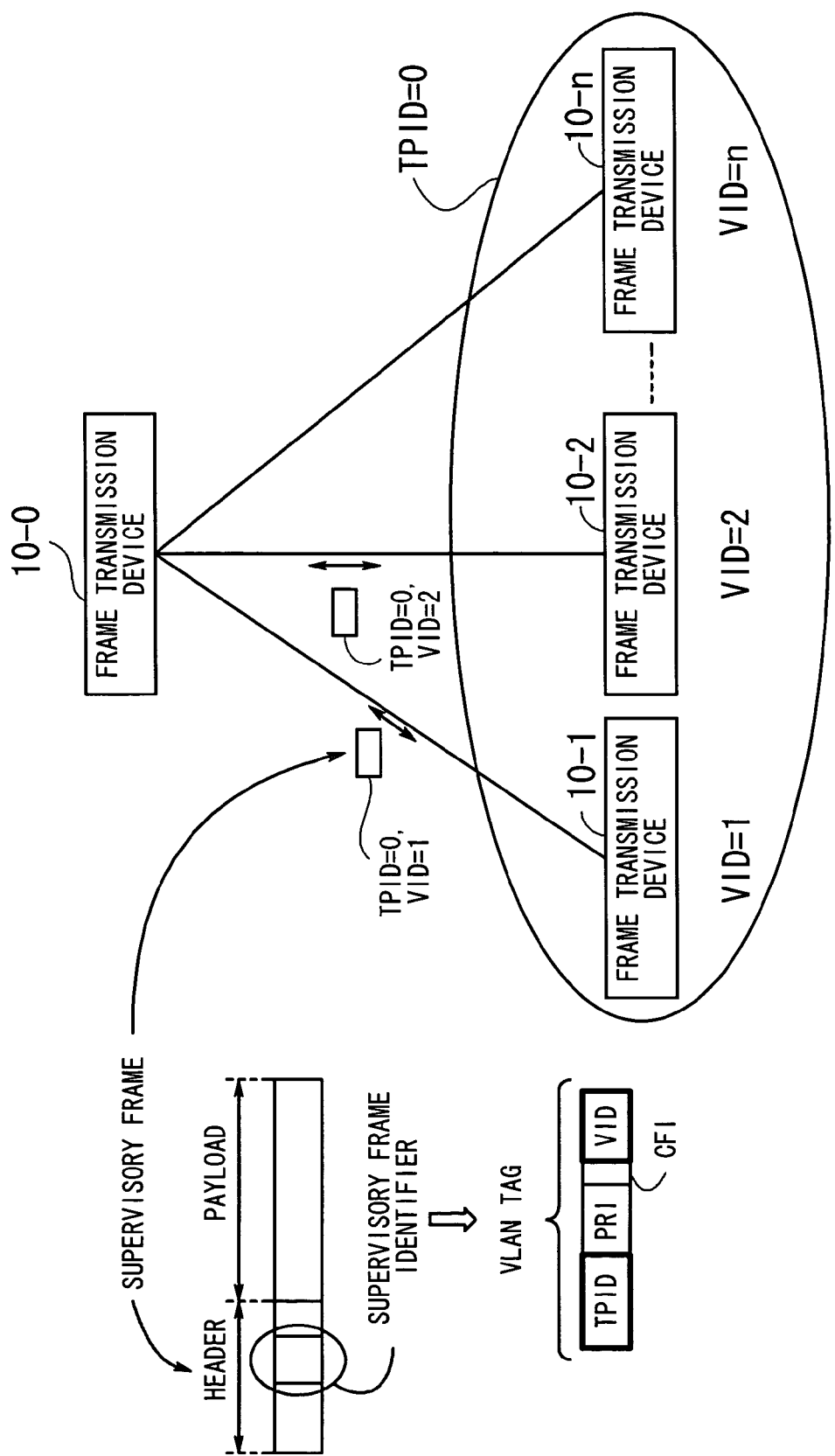
FIG. 10 is a diagram showing the manner of performing 1:n network supervision by using VLAN tag.

FIG. 10 shows the manner of performing 1:n network supervision by using the VLAN tag. The VLAN tag is a 4-byte field consisting of 16-bit TPID (Tag Protocol ID), 3-bit PRI (priority), 1-bit CFI (Canonical Format Identifier), and 12-bit VID.

A frame transmission device 10-0, which is located on an upstream side, exchanges supervisory frames with each of frame transmission devices 10-1 to 10-n located on a downstream side.

The supervisory frame identifier assigning section 17 of the present invention assigns TPID in the VLAN tag to each group of devices to be monitored and also assigns VID to each device. For example, the whole of the frame transmission devices 10-1 to 10-n is assigned TPID=0 and the individual frame transmission devices 10-1 to 10-n are assigned VID=1 to n, respectively. This allows the frame transmission device 10-0 to establish security for the 1:n devices as a network monitoring area and to perform supervisory control with respect to each device within the area.

Figure 11:
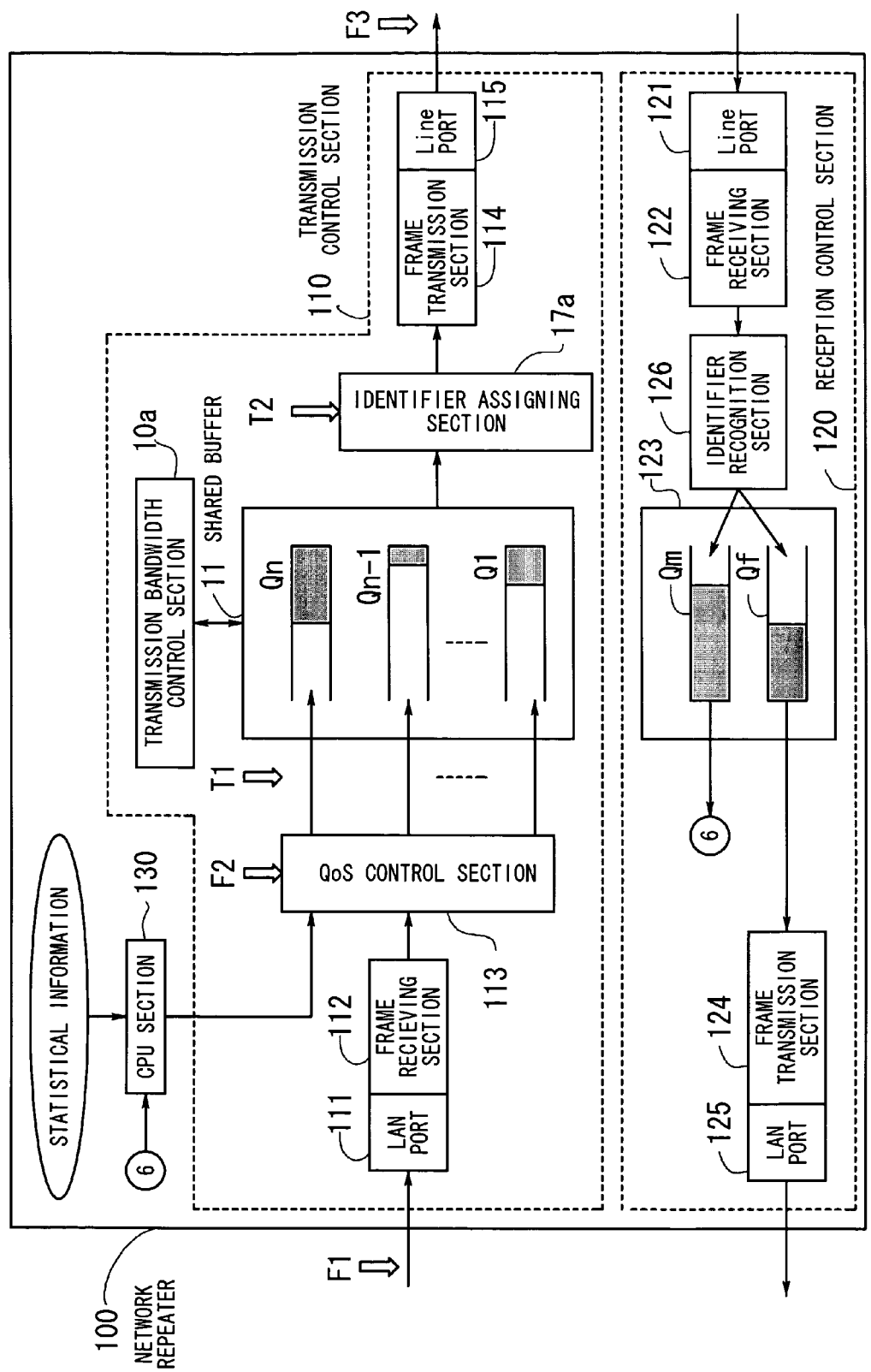
FIG. 11 is a diagram showing the configuration of a network repeater.

A network repeater having the function of the frame transmission device 10 of the present invention will be now described. FIG. 11 shows a configuration of the network repeater. The network repeater 100 is arranged, for example, at an IP network edge or in subscriber's home for relaying network communication data. Frame formats at positions F1 to F3 shown in the figure will be explained later with reference to FIG. 12, and time charts T1 and T2 will be explained with reference to FIGS. 13 and 14.

The network repeater 100 comprises a transmission control section 110, a reception control section 120, and a CPU section 130. The CPU section 130 is capable of connecting with a maintenance terminal such as an SNMP manager (not shown) (e.g., through an out-band port of a LAN controller) and globally controls the network repeater 100.

Also, the CPU section 130 monitors the repeater, generates a supervisory frame based on statistical information collected from its own device, and sends the frame to a QoS control section 113. Further, the CPU section receives and analyzes supervisory frames transmitted from opposing devices and notifies the maintenance terminal of the results of analysis.

In the transmission control section 110, a LAN port 111 is a port connected to various communication devices, such as terminals in subscriber's home, or a carrier network (IP network etc.). A frame receiving section 112 receives input frames. The reception process includes, for example, checking the FCS and preamble of a received frame and removing these fields if their correctness is confirmed.

When subscriber frames are received, the QoS control section 113 classifies the subscriber frames according to their types to be distributed to subscriber queues Q1 to Qn−1 of respective output classes. When supervisory frames are received from the CPU section 130, the QoS control section sends the frames to a supervisory queue Qn. The QoS control section also performs PIR (Peak Information Rate) control for cutting subscriber and supervisory frames that exceed maximum passing bandwidths of the respective classified queues. Further, the QoS control section 113 provides subscriber and supervisory frames with a field to be affixed with a VLAN tag and sends the frames to the respective queues.

An identifier assigning section 17a, which includes the function of the supervisory frame identifier assigning section 17 of the present invention, assigns a supervisory frame identifier (VLAN tag) to each received supervisory frame to permit supervisory frames to be distinguished from subscriber frames. When a subscriber frame is received, the identifier assigning section determines whether to affix an identifier. In the case where VLAN is set up for subscribers (private network is configured by VLAN among subscribers), VLAN tags are assigned to subscriber frames.

A frame transmitting section 114 affixes field information that has been removed in the frame receiving section 112 (this function is identical with that of the field information affixing section 18 explained with reference to FIGS. 6 and 7). A Line port 115 is connected to a relay network and the frames are transmitted from this port.

In the reception control section 120, a Line port 121 is connected to the relay network and receives frames transmitted therefrom. A frame receiving section 122, which has the same function as the aforementioned frame receiving section 112, checks the frames for correctness and removes fields such as FCS.

An identifier recognition section 126 identifies identifiers (VLAN tag) assigned to the frames. If the VLAN tag assigned to the received frame coincides with that assigned by the transmission-side identifier assigning section 17a (the VLAN tag coincidence condition used in this case can be optionally set depending on network systems and may be judged to be fulfilled when both TPID and VID coincide, or when TPID alone coincides, or when all 4 bytes coincide), it is judged that the received frame is a supervisory frame transmitted from the opposing device. In this case, after the VLAN tag is removed, the supervisory frame is sent to a supervisory queue Qm for storing supervisory frames.

If the VLAN tag assigned to the received frame differs from that assigned by the identifier assigning section 17a, it is judged that the received frame is a subscriber frame, and thus the frame is sent to a subscriber queue Qf without removing the VLAN tag. Also when the received frame has no VLAN tag assigned thereto, the frame is judged a subscriber frame and thus is sent to the subscriber queue Qf.

A receiving buffer 123 comprises the supervisory queue Qm for storing supervisory frames and the subscriber queue Qf for storing subscriber frames. The supervisory frames stored in the supervisory queue Qm are sent to the CPU section 130, and the subscriber frames stored in the subscriber queue Qf are sent to a frame transmitting section 124.

The frame transmitting section 124 affixes field information that has been removed by the frame receiving section 122. A LAN port 125 is a port connected to various communication devices, such as terminals in subscriber's home, or carrier network (IP network etc.), and the frames are transmitted from this port.

Figure 12:
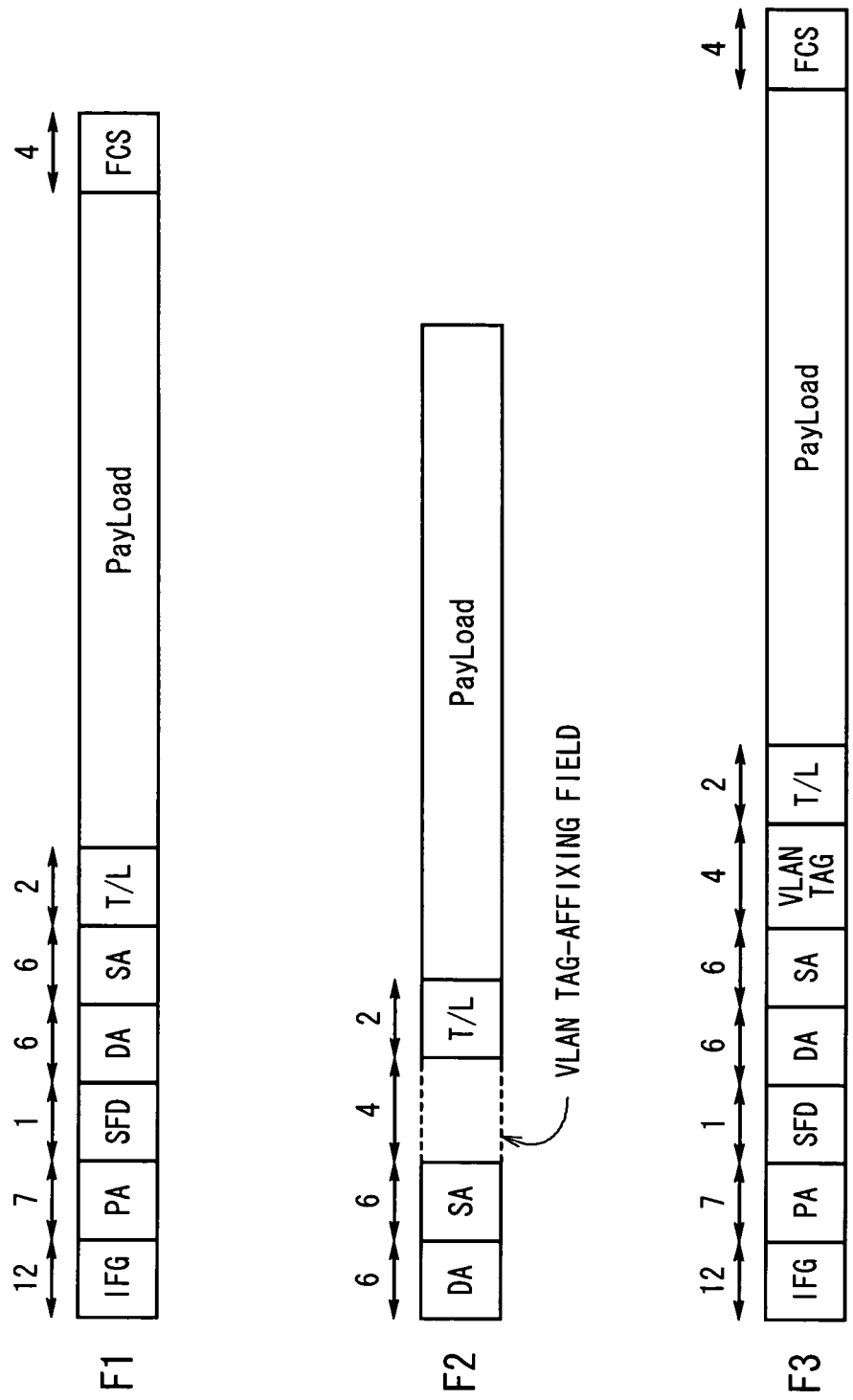
FIG. 12 is a diagram showing frame formats.

FIG. 12 illustrates the frame formats at the respective positions F1 to F3 shown in FIG. 11, wherein it is assumed that the input frame is a MAC frame (IEEE format).

The format at the input end position F1 of the device consists of IFG (12), PA (7), SFD (1), DA (6), SA (6), T/L (2), payload (optional byte length), and FCS (4) (the parenthesized numbers indicate numbers of bytes).

From the frame having such format, the fields IFG, PA, SFD and FCS are removed in the frame receiving section 112 (since IFG is an inter-frame gap, PA, SFD and FCS are the actually removed field information). Then, in the QoS control section 113, a field to be affixed with a VLAN tag is provided.

The frame format at the position F2, which is provided with the VLAN tag-affixing field, consists of DA (6), SA (6), VLAN tag-affixing field (4), T/L (2), and payload.

Subsequently, the frame is affixed with a VLAN tag in the identifier assigning section 17a and further with field information in the frame transmitting section 114, and therefore, the format at the output end position F3 of the device consists of IFG (12), PA (7), SFD (1), DA (6), SA (6), VLAN tag (4), T/L (2), payload (optional length), and FCS (4). (The VLAN tag structure is explained above with reference to FIG. 10 and thus description thereof is omitted.)

Figure 13:
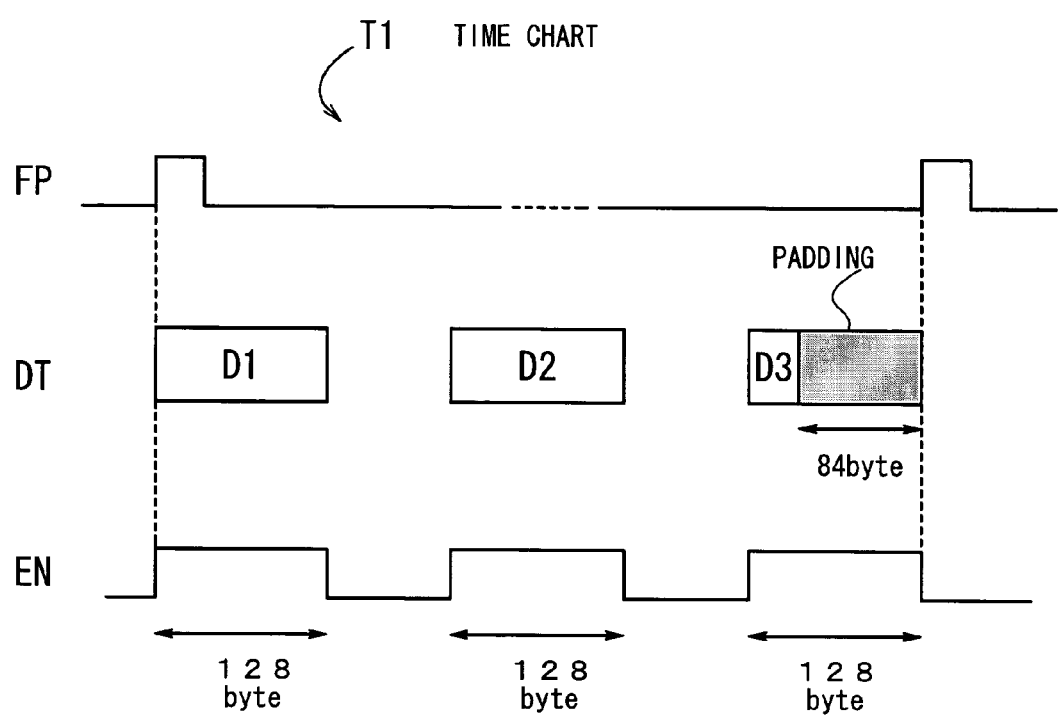
FIG. 13 shows a time chart.

FIG. 13 is the time chart T1 illustrating the state of the frame output from the QoS control section 113 to be stored in one of the queues Q1 to Qn. A frame is stored in a queue by being divided into blocks of, for example, 128 bytes (128 byte boundary).

FP denotes frame pulse, DT denotes frame data blocks into which a frame consisting of header and payload is divided, and EN denotes enable signal. FIG. 13 shows the manner of dividing a 300-byte frame into 128-byte data D1, 128-byte data D2, and 44-byte data D3 with 84-byte padding.

Figure 14:
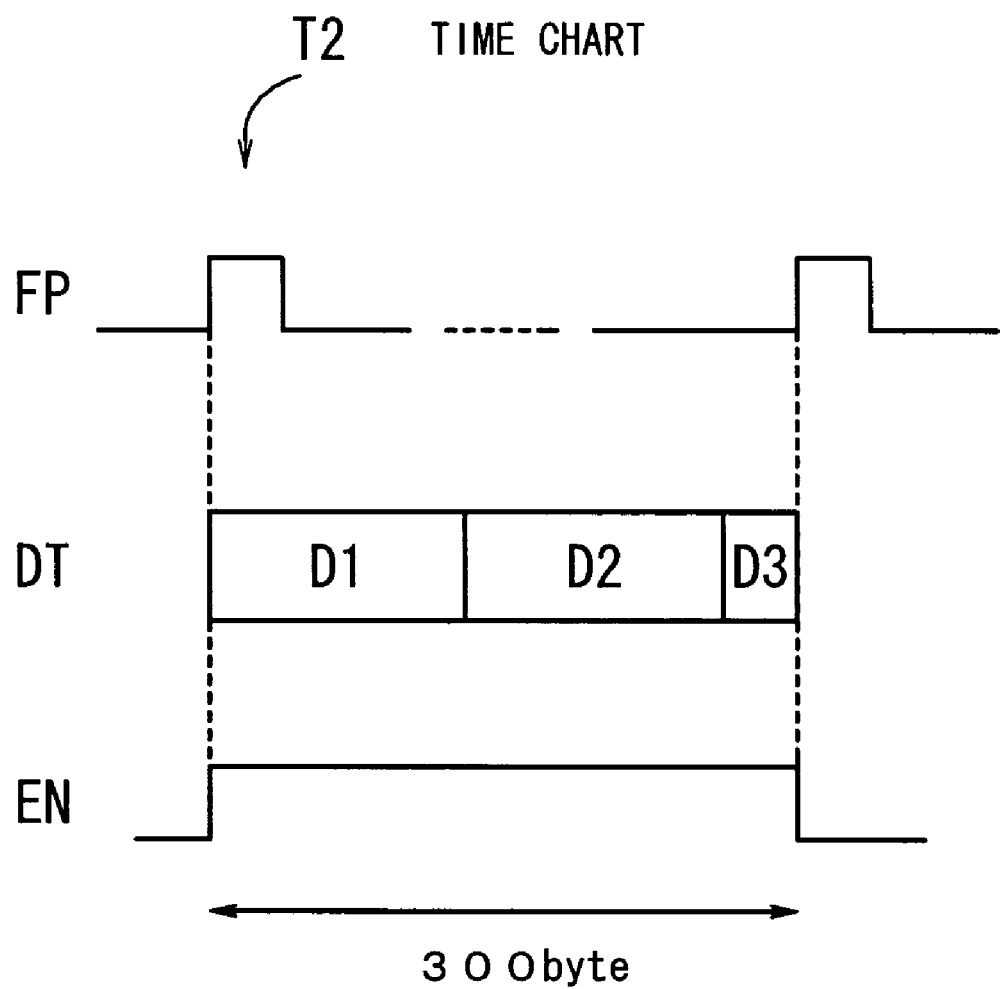
FIG. 14 shows another time chart.

FIG. 14 is the time chart T2 illustrating the state in which the frame data blocks output from the queue are assembled in the identifier assigning section 17a. As illustrated, the frame data blocks are reconstructed into one 300-byte frame with the 84-byte padding removed.

Figure 15:
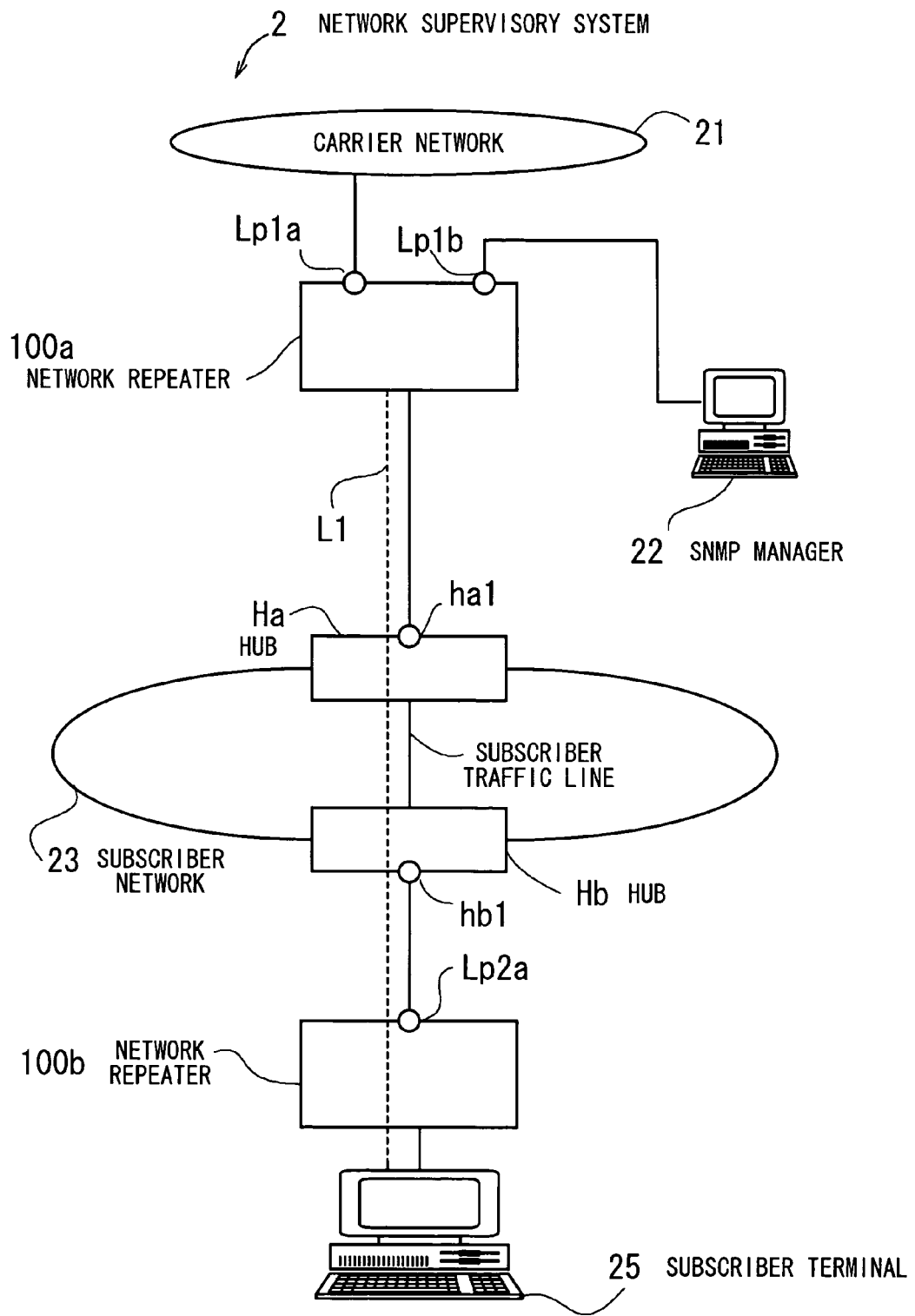
FIG. 15 is a diagram showing a network supervisory system according to the present invention.

The following describes a network supervisory system of the present invention including the network repeater 100. FIG. 15 shows the network supervisory system according to the present invention. In the network supervisory system 2, an upstream-side carrier network (e.g., IP network) 21 and a downstream-side subscriber network (e.g., Ethernet) 23 are connected by an upstream-side network repeater 100a and a downstream-side network repeater 100b, and the network repeaters 100a and 100b are monitored by an SNMP manager 22, which is a maintenance terminal. The subscriber network 23 is provided with hubs Ha and Hb.

The network repeater 100a, which is provided at the edge of the carrier network 21, connects with the carrier network 21 through a LAN port Lp1a. The hub Ha connects through a port ha1 with the network repeater 100a.

The hubs Ha and Hb are connected to each other through a subscriber traffic line in the subscriber network 23. The hub Hb has a port hb1 connected to a LAN port (in FIG. 11, Line port side) Lp2a of the network repeater 100b, which is connected to a subscriber terminal 25. The SNMP manager 22 is connected to a LAN port Lp1b of the upstream-side network repeater 100a.

In the case where supervisory information in the network repeater 100b located at a remote place is to be acquired by the SNMP manager 22, the network repeater 100b transmits a supervisory frame upstream through a transmission line L1 along with subscriber traffic, and the SNMP manager 22 acquires through the network repeater 100a the supervisory frame transmitted from the network repeater 100b.

Figure 16:
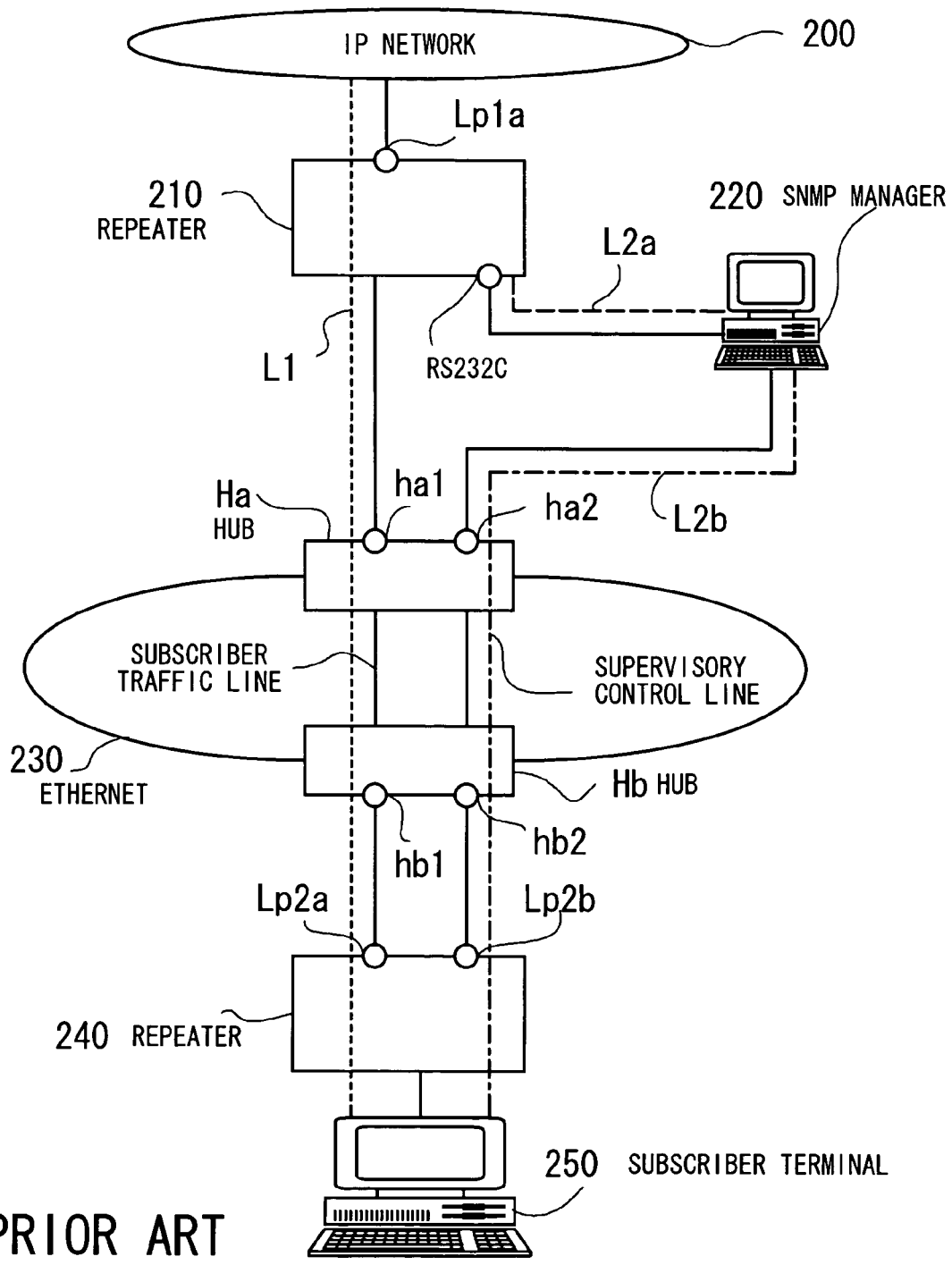
FIG. 16 is a diagram showing the configuration of a conventional network supervisory system.

Thus, in the network supervisory system 2 of the present invention, the network repeaters 100a and 100b have the function of transmitting and relaying both subscriber and supervisory frames through the primary signal line. Accordingly, unlike the conventional system (FIG. 16), it is unnecessary to provide supervisory control lines for transmitting supervisory frames, making it possible to effectively use network resources and to facilitate supervisory management.

As described above, according to the present invention, a remote device connected through a subscriber line can be monitored by means of subscriber traffic (inband monitoring is available), without using a dedicated line for supervisory control while at the same time guaranteeing the best-effort bandwidth for subscriber lines, thus making it possible to prevent network resources from being used wastefully.

In the above description of the present invention, the supervisory frame is used to carry device supervisory information, but may be used to carry other kinds of data, for example, maintenance signals such as control data (setting data) set by maintenance technicians, to allow such data to enter the subscriber traffic. Also, in the above instance, MAC frames are used as IP frames for carrying communication data. However, the frames may alternatively be other types of frames containing various communication data, such as MPLS packets and ATM cells, and the present invention can be applied to a wide range of transmission control techniques for transmitting different kinds of information (e.g., subscriber information and supervisory information) through a single transmission line.

In the frame transmission device according to the present invention, supervisory frames are given supervisory tokens as transmission permission to be output within the set minimum bandwidth, and also subscriber frames are given subscriber tokens as transmission permission to be output within the respective set transmission bandwidths. When the supervisory queue length is greater than the supervisory token storage amount and at the same time a remaining supervisory queue length in the supervisory queue obtained by subtracting the supervisory token storage amount from the supervisory queue length is smaller than or equal to the best-effort token storage amount, or when the subscriber queue length is greater than the corresponding subscriber token storage amount and at the same time a remaining subscriber queue length in the corresponding subscriber queue obtained by subtracting the subscriber token storage amount from the subscriber queue length is smaller than or equal to the best-effort token storage amount, the supervisory frames or subscriber frames are given best-effort tokens to be output using an extra bandwidth.

When monitoring a network, therefore, both supervisory frames and subscriber frames can be efficiently transmitted, and since no separate supervisory line is required, network resources can be effectively used. Also, since supervisory frames can be transmitted without securing a fixed bandwidth therefor, high-quality network supervision can be performed without lowering services for users.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A frame transmission device for causing supervisory frames to enter subscriber traffic to be transmitted along with subscriber frames, comprising:
 a shared buffer having subscriber queues for storing subscriber frames and a supervisory queue for storing supervisory frames;
 a queue length management section for managing a supervisory queue length which is a length of the supervisory queue, and subscriber queue lengths which are lengths of the respective subscriber queues;
 a supervisory token computing section capable of setting a minimum bandwidth for transmitting the supervisory frames and accumulating supervisory tokens for giving the supervisory frames permission to transmit within the set minimum bandwidth, said supervisory token computing section reducing the supervisory tokens in accordance with a result of queue read judgment;
 subscriber token computing sections associated with the respective subscriber queues and capable of optionally setting transmission bandwidths for the respective subscriber queues within a transmission bandwidth equal to a best-effort transmission bandwidth of the subscriber traffic minus the minimum bandwidth for the supervisory frames, said subscriber token computing sections accumulating subscriber tokens for giving the subscriber frames permission to transmit within the respective set transmission bandwidths and reducing the subscriber tokens in accordance with the queue read judgment result;

a best-effort token computing section capable of setting the best-effort transmission bandwidth of the subscriber traffic and accumulating best-effort tokens for giving the supervisory frames or the subscriber frames permission to transmit by using an extra bandwidth and within the set best-effort transmission bandwidth, said best-effort token computing section reducing the best-effort tokens in accordance with the queue read judgment result; and a queue read control section for comparing the queue lengths with respective token storage amounts as the queue read judgment when reading the frames from the respective queues, wherein when the supervisory queue length is smaller than or equal to the supervisory token storage amount, said queue read control section permits the supervisory frames to transmit within the minimum bandwidth and reads and outputs supervisory frames corresponding to the supervisory queue length from the supervisory queue, when the subscriber queue length is smaller than or equal to the corresponding subscriber token storage amount, said queue read control section permits the subscriber frames to transmit within the transmission bandwidth set with respect to the corresponding subscriber queue and reads and outputs subscriber frames corresponding to the subscriber queue length from the corresponding subscriber queue, when the supervisory queue length is greater than the supervisory token storage amount and at the same time a remaining supervisory queue length in the supervisory queue obtained by subtracting the supervisory token storage amount from the supervisory queue length is smaller than or equal to the best-effort token storage amount, said queue read control section permits the supervisory frames to transmit by using the extra bandwidth and reads and outputs supervisory frames corresponding to the remaining supervisory queue length from the supervisory queue, and when the subscriber queue length is greater than the corresponding subscriber token storage amount and at the same time a remaining subscriber queue length in the corresponding subscriber queue obtained by subtracting the subscriber token storage amount from the subscriber queue length is smaller than or equal to the best-effort token storage amount, said queue read control section permits the subscriber frames to transmit by using the extra bandwidth and reads and outputs subscriber frames corresponding to the remaining subscriber queue length from the corresponding subscriber queue.

2. The frame transmission device according to claim 1, wherein said supervisory token computing section adds supervisory tokens at regular intervals and, when supervisory frames are read from the supervisory queue, subtracts a corresponding supervisory queue length from the supervisory token storage amount, each said subscriber token computing section adds subscriber tokens at regular intervals and, when subscriber frames are read from the corresponding subscriber queue, subtracts a corresponding subscriber queue length from the subscriber token storage amount, and said best-effort token computing section adds best-effort tokens at regular intervals and, when supervisory tokens or subscriber tokens are subtracted, subtracts an equal amount of best-effort tokens from the best-effort token storage amount, wherein when the supervisory queue length is greater than the supervisory token storage amount and at the same time the remaining supervisory queue length in the supervisory queue obtained by subtracting the supervisory token storage amount from the supervisory queue length is smaller than or equal to the best-effort token storage amount, said best-effort token computing section subtracts the remaining supervisory queue length in the supervisory queue from the best-effort token storage amount, and when the subscriber queue length is greater than the corresponding subscriber token storage amount and at the same time the remaining subscriber queue length in the corresponding subscriber queue obtained by subtracting the subscriber token storage amount from the subscriber queue length is smaller than or equal to the best-effort token storage amount, said best-effort token computing section subtracts the remaining subscriber queue length in the subscriber queue from the best-effort token storage amount.

3. The frame transmission device according to claim 2, wherein when subtracting tokens, said supervisory token computing section, said subscriber token computing sections and said best-effort token computing section each subtract a sum of the corresponding queue length and a length of information which is affixed to a frame when the frame is output, from the corresponding token storage amount.

4. The frame transmission device according to claim 1, further comprising a supervisory frame identifier assigning section for assigning the supervisory frames a supervisory frame identifier for distinguishing the supervisory frames from the subscriber frames.

5. The frame transmission device according to claim 4, wherein said supervisory frame identifier assigning section uses VLAN tag as the supervisory frame identifier, and where there are a plurality of devices to be monitored, said supervisory frame identifier assigning section assigns TPID to a group of devices to be monitored and VID to each of the devices in the group, to thereby establish security for 1:n devices as a network monitoring area.

6. A network repeater for relaying subscriber and supervisory frames while causing supervisory frames to enter subscriber traffic to be transmitted along with subscriber frames, comprising:

a CPU section capable of communicating with a maintenance terminal and performing global control and supervisory control of said network repeater;

a transmission control section including a shared buffer having subscriber queues for storing subscriber frames and a supervisory queue for storing supervisory frames which are device supervisory information acquired from said CPU section, a supervisory frame identifier assigning section for assigning the supervisory frames a supervisory frame identifier for distinguishing the supervisory frames from the subscriber frames, and a transmission bandwidth control section for controlling transmission bandwidths for the supervisory and subscriber frames, said transmission control section outputting both the supervisory frames and the subscriber frames to a single transmission line while guaranteeing a minimum bandwidth for the supervisory frames and assuring best-effort transmission for the subscriber frames; and a reception control section for receiving frames transmitted thereto and checking the received frames for the supervisory frame identifier, said reception control section sending supervisory frames to said CPU section if the supervisory frames are destined for said network repeater and relaying other frames to a next-stage device if the frames are not destined for said network repeater.

7. The network repeater according to claim 6, wherein said transmission bandwidth control section includes:

a queue length management section for managing a supervisory queue length which is a length of the supervisory queue, and subscriber queue lengths which are lengths of the respective subscriber queues;

a supervisory token computing section capable of setting the minimum bandwidth for transmitting the supervisory frames and accumulating supervisory tokens for giving the supervisory frames permission to transmit within the set minimum bandwidth, said supervisory token computing section reducing the supervisory tokens in accordance with a result of queue read judgment;

subscriber token computing sections associated with the respective subscriber queues and capable of optionally setting transmission bandwidths for the respective subscriber queues within a transmission bandwidth equal to a best-effort transmission bandwidth of the subscriber traffic minus the minimum bandwidth for the supervisory frames, said subscriber token computing sections accumulating subscriber tokens for giving the subscriber frames permission to transmit within the respective set transmission bandwidths and reducing the subscriber tokens in accordance with the queue read judgment result;

a best-effort token computing section capable of setting the best-effort transmission bandwidth of the subscriber traffic and accumulating best-effort tokens for giving the supervisory frames or the subscriber frames permission to transmit by using an extra bandwidth and within the set best-effort transmission bandwidth, said best-effort token computing section reducing the best-effort tokens in accordance with the queue read judgment result; and a queue read control section for comparing the queue lengths with respective token storage amounts as the queue read judgment when reading the frames from the respective queues, wherein when the supervisory queue length is smaller than or equal to the supervisory token storage amount, said queue read control section permits the supervisory frames to transmit within the minimum bandwidth and reads and outputs supervisory frames corresponding to the supervisory queue length from the supervisory queue, when the subscriber queue length is smaller than or equal to the corresponding subscriber token storage amount, said queue read control section permits the subscriber frames to transmit within the transmission bandwidth set with respect to the corresponding subscriber queue and reads and outputs subscriber frames corresponding to the subscriber queue length from the corresponding subscriber queue, when the supervisory queue length is greater than the supervisory token storage amount and at the same time a remaining supervisory queue length in the supervisory queue obtained by subtracting the supervisory token storage amount from the supervisory queue length is smaller than or equal to the best-effort token storage amount, said queue read control section permits the supervisory frames to transmit by using the extra bandwidth and reads and outputs supervisory frames corresponding to the remaining supervisory queue length from the supervisory queue, and when the subscriber queue length is greater than the corresponding subscriber token storage amount and at the same time a remaining subscriber queue length in the corresponding subscriber queue obtained by subtracting the subscriber token storage amount from the subscriber queue length is smaller than or equal to the best-effort token storage amount, said queue read control section permits the subscriber frames to transmit by using the extra bandwidth and reads and outputs subscriber frames corresponding to the remaining subscriber queue length from the corresponding subscriber queue.

8. The network repeater according to claim 7, wherein said supervisory token computing section adds supervisory tokens at regular intervals and, when supervisory frames are read from the supervisory queue, subtracts a corresponding supervisory queue length from the supervisory token storage amount, each said subscriber token computing section adds subscriber tokens at regular intervals and, when subscriber frames are read from the corresponding subscriber queue, subtracts a corresponding subscriber queue length from the subscriber token storage amount, and said best-effort token computing section adds best-effort tokens at regular intervals and, when supervisory tokens or subscriber tokens are subtracted, subtracts an equal amount of best-effort tokens from the best-effort token storage amount, wherein when the supervisory queue length is greater than the supervisory token storage amount and at the same time the remaining supervisory queue length in the supervisory queue obtained by subtracting the supervisory token storage amount from the supervisory queue length is smaller than or equal to the best-effort token storage amount, said best-effort token computing section subtracts the remaining supervisory queue length in the supervisory queue from the best-effort token storage amount, and when the subscriber queue length is greater than the corresponding subscriber token storage amount and at the same time the remaining subscriber queue length in the corresponding subscriber queue obtained by subtracting the subscriber token storage amount from the subscriber queue length is smaller than or equal to the best-effort token storage amount, said best-effort token computing section subtracts the remaining subscriber queue length in the subscriber queue from the best-effort token storage amount.

9. The network repeater according to claim 8, wherein when subtracting tokens, said supervisory token computing section, said subscriber token computing sections and said best-effort token computing section each subtract a sum of the corresponding queue length and a length of information which is affixed to a frame when the frame is output, from the corresponding token storage amount.

10. The network repeater according to claim 6, further comprising a supervisory frame identifier assigning section for assigning the supervisory frames a supervisory frame identifier for distinguishing the supervisory frames from the subscriber frames.

11. The network repeater according to claim 10, wherein said supervisory frame identifier assigning section uses VLAN tag as the supervisory frame identifier, and where there are a plurality of devices to be monitored, said supervisory frame identifier assigning section assigns TPID to a group of devices to be monitored and VID to each of the devices in the group, to thereby establish security for 1:n devices as a network monitoring area.

12. A network supervisory system for monitoring a network, comprising:
an upstream-side network repeater located on an upstream side of the network, said upstream-side network repeater including: a CPU section for performing global control and supervisory control of said upstream-side network repeater; a transmission control section including a shared buffer having subscriber queues for storing subscriber frames and a supervisory queue for storing supervisory frames which are device supervisory information acquired from said CPU section, a supervisory frame identifier assigning section for assigning the supervisory frames a supervisory frame identifier for distinguishing the supervisory frames from the subscriber frames, and a transmission bandwidth control section for controlling transmission bandwidths for the supervisory and subscriber frames, said transmission control section outputting both the supervisory frames and the subscriber frames to a single transmission line while guaranteeing a minimum bandwidth for the supervisory frames and assuring best-effort transmission for the subscriber frames; and a reception control section for receiving frames transmitted thereto and checking the received frames for the supervisory frame identifier, said reception control section sending supervisory frames to said CPU section if the supervisory frames are destined for said upstream-side network repeater and relaying other frames to a next-stage device if the frames are not destined for said upstream-side network repeater;
a downstream-side network repeater located on a downstream side of the network and including a CPU section identical with said CPU section, a transmission control section identical with said transmission control section, and a reception control section identical with said reception control section; and
a maintenance terminal connected to and capable of communicating with said upstream-side network repeater or said downstream-side network repeater, said maintenance terminal acquiring supervisory frame information transmitted through a line of subscriber traffic to monitor and manage at least one of said upstream-side and downstream-side network repeaters.

13. A frame transmission method for causing supervisory frames to enter subscriber traffic to be transmitted along with subscriber frames, comprising the steps of:
storing supervisory frames in a supervisory queue;
storing subscriber frames in subscriber queues;
managing a supervisory queue length which is a length of the supervisory queue, and subscriber queue lengths which are lengths of the respective subscriber queues;
accumulating supervisory tokens for giving the supervisory frames permission to transmit within a minimum bandwidth;
accumulating subscriber tokens for giving the subscriber frames permission to transmit within a transmission bandwidth equal to a best-effort transmission bandwidth of the subscriber traffic minus the minimum bandwidth for the supervisory frames;
accumulating best-effort tokens for giving the supervisory frames or the subscriber frames permission to transmit by using an extra bandwidth and within the best-effort transmission bandwidth;
comparing the queue lengths with respective token storage amounts;
permitting the supervisory frames to transmit within the minimum bandwidth when the supervisory queue length is smaller than or equal to the supervisory token storage amount, and reading and outputting supervisory frames corresponding to the supervisory queue length from the supervisory queue;
permitting the subscriber frames to transmit within the transmission bandwidth set with respect to the corresponding subscriber queue when the subscriber queue length is smaller than or equal to the corresponding subscriber token storage amount, and reading and outputting subscriber frames corresponding to the subscriber queue length from the corresponding subscriber queue;
permitting the supervisory frames to transmit by using the extra bandwidth when the supervisory queue length is greater than the supervisory token storage amount and at the same time a remaining supervisory queue length in the supervisory queue obtained by subtracting the supervisory token storage amount from the supervisory queue length is smaller than or equal to the best-effort token storage amount, and reading and outputting supervisory frames corresponding to the remaining supervisory queue length from the supervisory queue; and
permitting the subscriber frames to transmit by using the extra bandwidth when the subscriber queue length is greater than the corresponding subscriber token storage amount and at the same time a remaining subscriber queue length in the corresponding subscriber queue obtained by subtracting the subscriber token storage amount from the subscriber queue length is smaller than or equal to the best-effort token storage amount, and reading and outputting subscriber frames corresponding to the remaining subscriber queue length from the corresponding subscriber queue, thereby enabling transmission of both the supervisory frames and the subscriber frames.

* * * * *